United States Patent
Raghavan et al.

(10) Patent No.: US 11,792,779 B2
(45) Date of Patent: Oct. 17, 2023

(54) TECHNIQUES FOR BEAM SWITCHING IN WIRELESS COMMUNICATIONS SYSTEMS

(71) Applicant: QUALCOMM Incorporated, San Diego, CA (US)

(72) Inventors: Vasanthan Raghavan, West Windsor Township, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/242,289

(22) Filed: Apr. 27, 2021

(65) Prior Publication Data

US 2022/0346078 A1   Oct. 27, 2022

(51) Int. Cl.
*H04W 72/044* (2023.01)
*H04W 76/14* (2018.01)
*H04B 7/06* (2006.01)

(52) U.S. Cl.
CPC ........ *H04W 72/046* (2013.01); *H04B 7/0695* (2013.01); *H04W 76/14* (2018.02)

(58) Field of Classification Search
CPC ... H04W 72/046; H04W 76/14; H04B 7/0695
See application file for complete search history.

(56) References Cited

U.S. PATENT DOCUMENTS

| | | | |
|---|---|---|---|
| 2013/0083750 A1* | 4/2013 | Nazar | H04L 1/1861 370/329 |
| 2018/0123675 A1* | 5/2018 | Shi | H04W 72/1226 |
| 2018/0248601 A1* | 8/2018 | Kishiyama | H04B 7/0417 |
| 2019/0053234 A1* | 2/2019 | Cui | H04W 72/0446 |
| 2019/0173562 A1* | 6/2019 | Yu | H04B 7/08 |
| 2019/0394634 A1* | 12/2019 | Akkarakaran | H04B 7/0617 |
| 2020/0014428 A1* | 1/2020 | Chen | H04B 7/024 |
| 2020/0059290 A1* | 2/2020 | Pan | H04B 7/0874 |
| 2020/0162144 A1* | 5/2020 | Zhou | H04B 7/0874 |
| 2020/0229008 A1* | 7/2020 | Islam | H04L 5/0051 |
| 2020/0259703 A1* | 8/2020 | Cirik | H04W 72/046 |
| 2020/0396703 A1* | 12/2020 | Luo | H04W 8/005 |
| 2021/0314048 A1* | 10/2021 | Nagaraj | H04W 16/28 |
| 2021/0345314 A1* | 11/2021 | Li | H04W 72/10 |
| 2022/0053544 A1* | 2/2022 | Kang | H04B 17/373 |
| 2022/0217686 A1* | 7/2022 | Matsumura | H04B 7/0628 |
| 2022/0272618 A1* | 8/2022 | Kim | H04W 72/0486 |
| 2023/0110967 A1* | 4/2023 | Sun | H04B 7/0628 370/329 |

* cited by examiner

*Primary Examiner* — Ian N Moore
*Assistant Examiner* — Sun Jong Kim
(74) *Attorney, Agent, or Firm* — Holland & Hart LLP

(57) ABSTRACT

The described techniques provide a first device configured to transmit, to a second device, an indication of a beam switching capability. In response, the second device schedules resources for a set of shared channel transmissions based on a first beam switching configuration. If the first beam switching configuration exceeds the beam switching capability of the first device, the first device applies a set of selection rules to the first beam switching configuration to obtain a second beam switching configuration and communicates with the second device according to the second beam switching configuration.

29 Claims, 17 Drawing Sheets

TECHNIQUES FOR BEAM SWITCHING IN WIRELESS COMMUNICATIONS SYSTEMS

FIELD OF TECHNOLOGY

The following relates to wireless communication, including techniques for beam switching in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems support beamformed communications in which devices share information via directional beams. Some such systems support using different beams for multiple transmissions within a time period such that devices may switch between beams to transmit or receive communications according to a configuration or a capability of the devices. It may be beneficial to implement techniques for beam switching in wireless communications systems.

SUMMARY

The described techniques relate to improved methods, systems, devices, and apparatuses that support techniques for beam switching in wireless communications systems. Generally, the described techniques provide for a first device to transmit, to a second device, an indication of a beam switching capability (e.g., a number of beam switches the first device is able to perform within a time period). In response, the second device may schedule resources for a set of shared channel transmissions based on a first beam switching configuration. In some examples, the first beam switching configuration may exceed the reported beam switching capability of the first device. In case of such conflicts, it may be beneficial to implement deterministic/agreed set of techniques for the first device to determine a set of beam switches to perform based on the first beam switching configuration and the beam switching capability of the first device.

In some examples, the first device may apply at least one selection rule to the first beam switching configuration to obtain a second beam switching configuration (e.g., a set of beam switches to perform). For example, the first device may, according to a set of selection rules, determine a subset of a set of beam switches indicated by the first beam switching configuration if a capability of the first device is insufficient to perform each beam switch of the set of beam switches requested by the second device. In some examples, the first device may have an actual beam switching capability which is different from the reported beam switching capability and may select a set of beam switches accordingly. In some examples, the second device may determine a set of beam switching hypotheses based on the set of selection rules (e.g., may predict which beam switches the first device will perform) and may process the shared channel transmissions according to the inferred hypotheses. The first device and the second device may communicate via the set of shared channel transmissions according to the second beam switching configuration and the set of beam switching hypotheses. Implementing aspects of the present disclosure may enable devices to select beam switches based on an actual device capability without increasing signaling overhead which may lead to a more efficient resource utilization, among other benefits.

A method for wireless communication at a first device is described. The method may include transmitting, to a second device, an indication of a beam switching capability of the first device, receiving, from the second device, control information scheduling resources for communicating via a set of shared channel transmissions, the resources based on a first beam switching configuration, the first beam switching configuration exceeding the beam switching capability of the first device, determining a second beam switching configuration based on applying at least one selection rule to the first beam switching configuration, and communicating via the set of shared channel transmissions over the scheduled resources based on the second beam switching configuration.

An apparatus for wireless communication at a first device is described. The apparatus may include a processor, memory coupled with the processor, and instructions stored in the memory. The instructions may be executable by the processor to cause the apparatus to transmit, to a second device, an indication of a beam switching capability of the first device, receive, from the second device, control information scheduling resources for communicating via a set of shared channel transmissions, the resources based on a first beam switching configuration, the first beam switching configuration exceeding the beam switching capability of the first device, determine a second beam switching configuration based on applying at least one selection rule to the first beam switching configuration, and communicate via the set of shared channel transmissions over the scheduled resources based on the second beam switching configuration.

Another apparatus for wireless communication at a first device is described. The apparatus may include means for transmitting, to a second device, an indication of a beam switching capability of the first device, means for receiving, from the second device, control information scheduling resources for communicating via a set of shared channel transmissions, the resources based on a first beam switching configuration, the first beam switching configuration exceeding the beam switching capability of the first device, means for determining a second beam switching configuration based on applying at least one selection rule to the first beam switching configuration, and means for communicating via the set of shared channel transmissions over the scheduled resources based on the second beam switching configuration.

A non-transitory computer-readable medium storing code for wireless communication at a first device is described.

The code may include instructions executable by a processor to transmit, to a second device, an indication of a beam switching capability of the first device, receive, from the second device, control information scheduling resources for communicating via a set of shared channel transmissions, the resources based on a first beam switching configuration, the first beam switching configuration exceeding the beam switching capability of the first device, determine a second beam switching configuration based on applying at least one selection rule to the first beam switching configuration, and communicate via the set of shared channel transmissions over the scheduled resources based on the second beam switching configuration.

In some examples of the method, apparatuses, and non-transitory computer-readable medium described herein, applying the at least one selection rule may include operations, features, means, or instructions for determining a subset of a set of beam switches associated with the first beam switching configuration according to a predetermined selection rule, where the second beam switching configuration includes the subset of the set of beam switches.

In some examples of the method, apparatuses, and non-transitory computer-readable medium described herein, the first beam switching configuration includes a set of N beam switches and the beam switching capability of the first device includes a capability to perform M beam switches.

Some examples of the method, apparatuses, and non-transitory computer-readable medium described herein may further include operations, features, means, or instructions for selecting M beam switches that may be first in time of the set of N beam switches of the first beam switching configuration and selecting the $M^{th}$ beam for the N-M other beam switches of the set of N beam switches of the first beam switching configuration, where the second beam switching configuration may be based on selecting the M beam switches and selecting the $M^{th}$ beam for the N-M other beam switches.

Some examples of the method, apparatuses, and non-transitory computer-readable medium described herein may further include operations, features, means, or instructions for selecting an M-fold permutation of the set of N beam switches of the first beam switching configuration, where the second beam switching configuration includes the M-fold permutation.

In some examples of the method, apparatuses, and non-transitory computer-readable medium described herein, applying the at least one selection rule may include operations, features, means, or instructions for determining an actual beam switching capability of the first device, the actual beam switching capability different from the indicated beam switching capability and determining a set of beam switches associated with the first beam switching configuration based on the actual beam switching capability, where the second beam switching configuration includes the set of beam switches.

Some examples of the method, apparatuses, and non-transitory computer-readable medium described herein may further include operations, features, means, or instructions for determining the actual beam switching capability may be based on a correspondence between a set of antenna components of the first device and the set of beam switches associated with the first beam switching configuration.

In some examples of the method, apparatuses, and non-transitory computer-readable medium described herein, applying the at least one selection rule may include operations, features, means, or instructions for determining respective performance metrics for a set of beam switches associated with the first beam switching configuration and determining a subset of the set of beam switches associated with the first beam switching configuration based on the respective performance metrics, where the second beam switching configuration includes the subset of the set of beam switches.

In some examples of the method, apparatuses, and non-transitory computer-readable medium described herein, determining the respective performance metrics may include operations, features, means, or instructions for determining a reference signal received power (RSRP) associated with each beam switch of the set of beam switches associated with the first beam switching configuration.

In some examples of the method, apparatuses, and non-transitory computer-readable medium described herein, applying the at least one selection rule may include operations, features, means, or instructions for determining a beam associated with receiving the control information, where the second beam switching configuration includes the beam associated with receiving the control information.

In some examples of the method, apparatuses, and non-transitory computer-readable medium described herein, applying the at least one selection rule may include operations, features, means, or instructions for determining a beam associated with a sidelink with a third device, where the second beam switching configuration includes the beam associated with the sidelink.

Some examples of the method, apparatuses, and non-transitory computer-readable medium described herein may further include operations, features, means, or instructions for applying the at least one selection rule includes determining a most recently used beam different from a beam associated with receiving the control information and the second beam switching configuration includes the most recently used beam.

Some examples of the method, apparatuses, and non-transitory computer-readable medium described herein may further include operations, features, means, or instructions for receiving an indication that the first device may be to apply the at least one selection rule, where determining the second beam switching configuration may be based on the receiving the indication that the first device may be to apply the at least one selection rule.

In some examples of the method, apparatuses, and non-transitory computer-readable medium described herein, receiving the indication that the first device may be to apply the at least one selection rule may include operations, features, means, or instructions for receiving the indication that the first device may be to apply the at least one selection rule via downlink control information (DCI) of a scheduling grant, a configured grant, a beam switching command in a Medium Access Control (MAC) control element (MAC-CE) or DCI, or via sidelink control signaling.

Some examples of the method, apparatuses, and non-transitory computer-readable medium described herein may further include operations, features, means, or instructions for receiving an indication of a set of selection rules, where the set of selection rules includes the at least one selection rule.

Some examples of the method, apparatuses, and non-transitory computer-readable medium described herein may further include operations, features, means, or instructions for receiving an indication of a set of beam switches the first device may be to perform for communicating via the set of shared channel transmissions, the set of beam switches associated with concurrent beams associated with two or more transmission reception points of the first device.

A method for wireless communication at a first device is described. The method may include receiving, from a second device, an indication of a beam switching capability of the second device, transmitting, to the second device, control information scheduling resources for communicating via a set of shared channel transmissions, the resources based on a first beam switching configuration, the first beam switching configuration exceeding the beam switching capability of the second device, determining a second beam switching configuration based on applying at least one selection rule to the first beam switching configuration, and communicating via the set of shared channel transmissions over the scheduled resources based on the second beam switching configuration.

An apparatus for wireless communication at a first device is described. The apparatus may include a processor, memory coupled with the processor, and instructions stored in the memory. The instructions may be executable by the processor to cause the apparatus to receive, from a second device, an indication of a beam switching capability of the second device, transmit, to the second device, control information scheduling resources for communicating via a set of shared channel transmissions, the resources based on a first beam switching configuration, the first beam switching configuration exceeding the beam switching capability of the second device, determine a second beam switching configuration based on applying at least one selection rule to the first beam switching configuration, and communicate via the set of shared channel transmissions over the scheduled resources based on the second beam switching configuration.

Another apparatus for wireless communication at a first device is described. The apparatus may include means for receiving, from a second device, an indication of a beam switching capability of the second device, means for transmitting, to the second device, control information scheduling resources for communicating via a set of shared channel transmissions, the resources based on a first beam switching configuration, the first beam switching configuration exceeding the beam switching capability of the second device, means for determining a second beam switching configuration based on applying at least one selection rule to the first beam switching configuration, and means for communicating via the set of shared channel transmissions over the scheduled resources based on the second beam switching configuration.

A non-transitory computer-readable medium storing code for wireless communication at a first device is described. The code may include instructions executable by a processor to receive, from a second device, an indication of a beam switching capability of the second device, transmit, to the second device, control information scheduling resources for communicating via a set of shared channel transmissions, the resources based on a first beam switching configuration, the first beam switching configuration exceeding the beam switching capability of the second device, determine a second beam switching configuration based on applying at least one selection rule to the first beam switching configuration, and communicate via the set of shared channel transmissions over the scheduled resources based on the second beam switching configuration.

In some examples of the method, apparatuses, and non-transitory computer-readable medium described herein, applying the at least one selection rule may include operations, features, means, or instructions for determining a sequential subset of a set of beam switches associated with the first beam switching configuration, where the second beam switching configuration includes the sequential subset of the set of beam switches.

In some examples of the method, apparatuses, and non-transitory computer-readable medium described herein, applying the at least one selection rule may include operations, features, means, or instructions for determining a subset of a set of beam switches associated with the first beam switching configuration according to a predetermined selection rule, where the second beam switching configuration includes the subset of the set of beam switches.

In some examples of the method, apparatuses, and non-transitory computer-readable medium described herein, applying the at least one selection rule may include operations, features, means, or instructions for determining respective performance metrics for a set of beam switches associated with the first beam switching configuration and determining a subset of the set of beam switches associated with the first beam switching configuration based on determining the respective performance metrics, where the second beam switching configuration includes the subset of the set of beam switches.

In some examples of the method, apparatuses, and non-transitory computer-readable medium described herein, determining the respective performance metrics may include operations, features, means, or instructions for determining a RSRP for each beam switch of the set of beam switches associated with the first beam switching configuration.

In some examples of the method, apparatuses, and non-transitory computer-readable medium described herein, applying the at least one selection rule may include operations, features, means, or instructions for determining a beam associated with transmitting the control information, where the second beam switching configuration includes the beam associated with transmitting the control information.

In some examples of the method, apparatuses, and non-transitory computer-readable medium described herein, applying the at least one selection rule may include operations, features, means, or instructions for determining a most recently used beam different from a beam associated with receiving the control information, where the second beam switching configuration the most recently used beam.

Some examples of the method, apparatuses, and non-transitory computer-readable medium described herein may further include operations, features, means, or instructions for transmitting an indication of a set of selection rules, where the set of selection rules includes the at least one selection rule.

Some examples of the method, apparatuses, and non-transitory computer-readable medium described herein may further include operations, features, means, or instructions for transmitting an indication that the second device may be to apply the at least one selection rule, where determining the second beam switching configuration may be based on the transmitting the indication that the second device may be to apply the at least one selection rule.

In some examples of the method, apparatuses, and non-transitory computer-readable medium described herein, receiving the indication that the second device may be to apply the at least one selection rule may include operations, features, means, or instructions for transmitting the indication that the second device may be to apply the at least one selection rule via DCI of a scheduling grant, a configured grant, a beam switching command in a MAC-CE or DCI, or via sidelink control signaling.

In some examples of the method, apparatuses, and non-transitory computer-readable medium described herein, determining the second beam switching configuration may include operations, features, means, or instructions for processing the set of shared channel transmissions according to a set of multiple beam switching configuration hypotheses and determining the second beam switching configuration from among the set of multiple beam switching configuration hypotheses based on the processing.

Some examples of the method, apparatuses, and non-transitory computer-readable medium described herein may further include operations, features, means, or instructions for transmitting an indication of a set of beam switches the first device may be to perform for communicating via the set of shared channel transmissions, the set of beam switches associated with concurrent beams associated with two or more transmission reception points of the first device.

DETAILED DESCRIPTION

Figure 1:
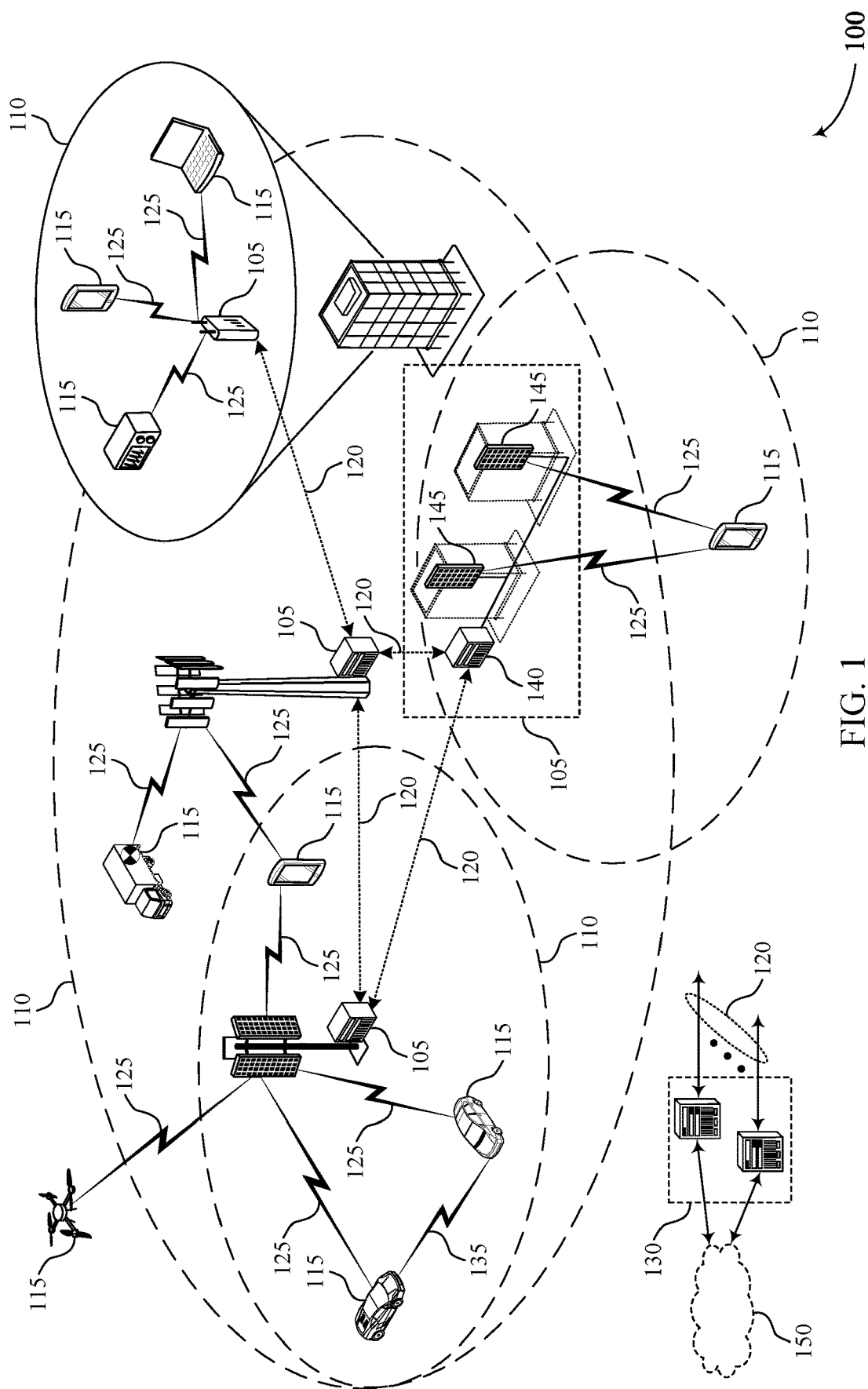
FIG. 1 illustrates an example of a wireless communications system that supports techniques for beam switching in wireless communications systems in accordance with aspects of the present disclosure.

Some wireless communication systems, such as fifth generation (5G) New Radio (NR) systems, support beamformed communications in which devices share information via directional communication beams. Some such systems support using different beams for multiple transmissions within a time period (e.g., within a slot). For example, if a user equipment (UE) reports a beam switching capability, a base station may schedule multiple shared channel transmissions (e.g., physical downlink shared channel (PDSCH), physical uplink shared channel (PUSCH), or physical sidelink shared channel (PSSCH) transmissions) within a slot according to resources assigned to use different beams. The base station may indicate the UE to perform a number of beam switches (e.g., may indicate a beam switching configuration) based on the scheduled resources.

In some examples, the indicated beam switching configuration may exceed the reported capability of the UE. For example, the base station may indicate the UE to perform a greater number of beam switches within a time period than the UE is able to perform, as indicated via the reported capability. However, the UE may have an actual capability which is different from the reported capability (e.g., the UE may report a reduced capability to reduce a signaling overhead). Due to a difference in capability or an indicated configuration which exceeds the reported capability, there may exist a mismatch between a set of indicated beam switches and a set of beam switches that the UE is capable of, or will/can, perform. Such a mismatch may lead to a reduced efficiency of communications or a reduced efficiency of resource utilization. It may be beneficial to establish techniques whereby devices may determine or predict or agree on a set of beam switches to use for communicating via shared channel transmissions based on a set of selection rules.

One such method may include a first device (e.g., a UE) transmitting a beam switching capability to a second device (e.g., a base station). The beam switching capability may include a number of beam switches the first device is capable of performing within a time period or within a slot. The second device may transmit control signaling, to the first device, scheduling resources for a set of shared channel transmissions (e.g., PDSCH, PUSCH, or PSSCH transmissions) based on a first beam switching configuration which may exceed the reported beam switching capability of the first device. The first device may receive the control information and may apply a set of selection rules to obtain a second beam configuration (e.g., based on the reported beam switching capability or an actual beam switching capability of the first device which may be different from the reported beam switching capability).

If the first beam switching configuration indicates a set of beam switches, the first device may determine a subset of the set of beam switches to perform based on the capability of the first device. For example, if the first beam switching configuration indicates N beam switches and the first device is capable to perform M beam switches, the first device may determine a subset of M beam switches to perform. In some examples, the first device may determine to perform the first M (of the N) beam switches. In some cases, the first device may retain the $M^{th}$ beam switch for the remaining N-M beam switches of the first beam switching configuration. In some examples, the first device may select an M-fold permutation of the N beam switches to perform. The M-fold permutation may be selected (e.g., may be any permutation) from the complete or an agreed set of M-fold permutations of the N beam switches. For example, the first beam switching configuration may indicate for the first device to use a particular set of M+1 beams across M+1 time periods (e.g., slots, symbols), and determining an M-fold permutation may include the first device selecting any subset of M+1 beams to apply of the set of N+1 beams. In some implementations, the first device may select a subset of beam switches to perform based on associated channel metrics (e.g., reference signal received power (RSRP)). In some implementations, the first device may select a beam used to receive the control information, a sidelink beam, or a most recently used beam. In some examples, if the actual beam switching capability (e.g., based on antenna components, the first beam switching configuration, etc.) of the first device satisfies a threshold, the first device may perform all of the indicated beam switches regardless of the reported beam switching capability.

In some examples, the second device may indicate a set of selection rules for the first device to use or may indicate the first device to apply a pre-configured set of selection rules. In some implementations, the second device may determine a set of beam switching configuration hypotheses based on the set of selection rules (e.g., may predict which beam switches the first device may perform). The first device and the second device may communicate via the set of shared channel transmissions according to the first beam switching configuration, the second beam switching configuration, or the set of beam switching configuration hypotheses. Implementing various aspects of the present disclosure may lead to a more efficient resource utilization, a reduced signaling overhead, or improved coordination between devices, among other benefits.

Aspects of the disclosure are initially described in the context of wireless communications systems. Aspects of the disclosure are further described by and with reference to a process flow in a system that supports techniques for beam switching in wireless communications systems. Aspects of the disclosure are further illustrated by and described with reference to apparatus diagrams, system diagrams, and flowcharts that relate to techniques for beam switching in wireless communications systems.

FIG. 1 illustrates an example of a wireless communications system 100 that supports techniques for beam switching in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some examples of the wireless communications system 100 may support using different beams for multiple shared channel transmissions within a time period. Devices (e.g., UEs 115, base stations 105, etc.) may use different beams over different time periods, symbols, or slots based on power to performance tradeoffs. For example, devices may switch direction beams for each transmission within the time period. In some examples, a capability of a device to perform beam switching may be based on a radio frequency settling time associated with the device which may indicate an amount of time taken by the device (e.g., radio frequency circuitry or components of the device) to stabilize phase, amplitude, or beam weight across a transmission or reception path. The radio frequency settling time associated with the device may determine a number of beam switches the device is capable to perform within a time period. In high radio frequency spectrum bands (e.g., designated FR2X, FR4, etc.) beam switching capabilities may be dependent on number of subarrays, antenna modules, or radio frequency integrated circuits, which may be indicated by a device. In some examples, a device may be indicated to perform a set of beam switches which exceeds a capability of the device.

A device (e.g., a UE 115) may be configured with at least one time domain resource allocation table with up to sixteen rows indicating scheduling parameters such as mapping types, scheduling offsets (e.g., $K_0$ for PDSCH or $K_2$ for PUSCH), a starting symbol index S, or a number of symbols L. The device may use the time domain resource allocation table to transmit or receive communications. For example, a UE 115 may receive a physical downlink control channel (PDCCH) in a slot n indicating a row index and downlink allocation for a PDSCH the UE 115 is to receive. If the scheduling offset associated with the row index is $K_0$, the UE 115 may determine that the PDSCH is transmitted by a base station 105 in slot $n+K_0$ (e.g., on symbols S, S+1, S+(L−1)) and may monitor for the PDSCH accordingly. Similarly, a UE 115 may receive a PDCCH in slot n indicated a row index and uplink grant for a PUSCH the UE 115 is to transmit. If the scheduling offset for the row index is $K_2$, the UE 115 may determine to transmit the PUSCH to a base station 105 in a slot $n+K_2$ (e.g., on symbols S, S+1, S+(L−1)). A beam switching capability of the UE 115 may determine whether the UE 115 may change beams if a shared channel transmission is indicated at a scheduling offset (e.g., $K_0$ or $K_2$).

If a UE 115 is capable to change beams before the indicated scheduling offset, the UE 115 may use a beam indicated by a transmission configuration indication (TCI) state received in downlink control information (DCI) from a base station 105. If a capability of the UE 115 is insufficient to change beams before the scheduling offset, the UE 115 may use a default beam which is quasi co-located with a PDCCH demodulation reference signal (DMRS) of a CORESET having a lowest identifier. In some implementations, a capability of the UE 115 to use the default beam may be based on a time for the UE 115 to apply spatial quasi co-location information (e.g., according to a timeDuration-ForQCL capability field). Accordingly, there may exist examples in which a device (e.g., a UE 115) has capability which is insufficient to perform a default beam switch or an indicated beam switch. Additionally, or alternatively, the device may have an actual capability which is different from a reported capability (e.g., due to radio frequency circuitry at the device and a signaling overhead for reporting capability information). It may be beneficial to implement techniques whereby a device may determine a set of beam switches to perform based on a capability of the device.

One such method may include a UE 115 receiving control information from a base station 105 scheduling a set of shared channel transmissions (e.g., PDSCH, PUSCH, or PSSCH transmissions) according to a first beam switching configuration exceed an indicated capability of the UE 115. The UE 115 may apply at least one selection rule to obtain a second beam switching configuration (e.g., a set of beam switches which the UE 115 may perform according to an actual capability of the UE 115). For example, the UE 115 may determine a sequential subset, or any permutation, of indicated beam switches to perform. In some implementations, the UE 115 may determine which beam switches to perform based on associated channel metrics, such as RSRP.

The base station 105 may similarly apply selection rules to determine a set of beam switching configuration hypotheses predicting which beam switches the UE 115 may perform. The base station 105 and the UE 115 may communicate via the shared channel transmissions according to the second beam switching configuration and the beam switching configuration hypotheses. Implementing various aspects of the present disclosure may lead to a more efficient resource utilization, a reduced signaling overhead, or an improved coordination between devices, among other benefits.

Figure 2:
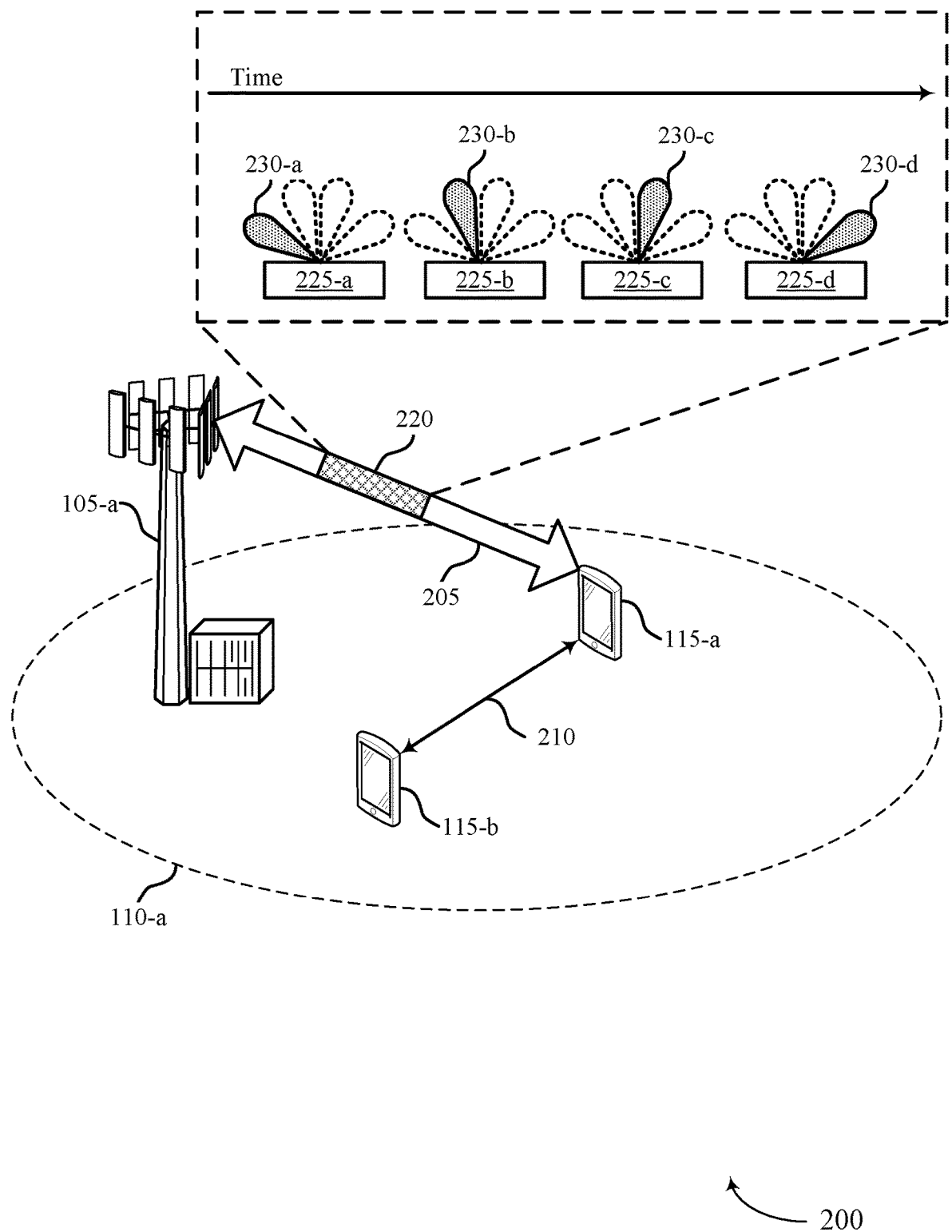
FIG. 2 illustrates an example of a wireless communications system that supports techniques for beam switching in wireless communications systems in accordance with aspects of the present disclosure.

FIG. 2 illustrates an example of a wireless communications system 200 that supports techniques for beam switching in wireless communications systems, in accordance with various aspects of the present disclosure. In some examples, the wireless communications system 200 may implement aspects of a wireless communications system 100, as described with reference to FIG. 1. The wireless communications system 200 may include a UE 115-*a* and a UE 115-*b* which may be examples of a UE 115, as described with reference to FIG. 1. the wireless communications system 200 may also include a base station 105-*a* which may be an example of a base station 105, as described with reference to FIG. 1. The base station may be associated with a cell providing wireless communications services within a coverage area 110-*a*. Accordingly, the base station 105-*a* and the UE 115-*a* may share information via a communication link 205 which may be an access link (e.g., a Uu interface). The UE 115-*a* and the UE 115-*b* may share information via a sidelink 210. The wireless communications system 200 may support beamformed communications including switching beams for multiple shared channel transmissions within a time period.

One method for beam switching may include the UE 115-*a* transmitting an indication of a beam switching capability to the base station 105-*a*. The beam switching capability may include an indication of a radio frequency settling time or an indication of a number of beam switches which the UE 115-*a* is capable to perform within a time period (e.g., within a slot or between slots). The beam switching capability may be signaled as part of UE capability signaling in connection establishment with the base station 105-*a* and may be conveyed using a UE class or category corresponding to a beam switching capability. The base station 105-*a* may schedule a set of shared channel transmissions 220 (e.g., PDSCH or PUSCH transmissions) for communicating with the UE 115-*a*. It is noted that while described with reference to shared channel communications between the base station 105-*a* and the UE 115-*a*, the present disclosure may similarly be applied to shared channel communications between the UE 115-*a* and the UE 115-*b* (e.g., PSSCH transmissions).

The base station 105-*a* may schedule the set of shared channel transmissions 220 according to a first beam switching configuration. For example, the set of shared channel transmissions 220 may include an element 225-*a*, an element 225-*b*, an element 225-*c*, and an element 225-*d*, which may be examples of symbols, slots, or other time periods associated with the set of shared channel transmissions 220. The base station 105 may configure the element 225-*a* to use a beam 230-*a*, the element 225-*b* to use a beam 230-*b*, the element 225-*c* to use a beam 230-*c*, and the element 225-*d* to use a beam 230-*d*. In some examples, the base station 105 may apply the first beam switching configuration based on a power to performance tradeoff associated with the first beam switching configuration and other potential beam switching configurations. The first beam switching configuration may exceed the indicated beam switching capability of the UE 115-*a*.

Accordingly, the UE 115-*a* may apply at least one selection rule to determine a second beam switching configuration based on the beam switching capability of the UE 115-*a*. The first beam switching configuration may indicate a set of N beam switches the UE 115-*a* is to perform. If the UE 115-*a* has a capability to perform M beam switches, the UE 115-*a* may determine a subset of the set of N beam switches to perform. For example, the UE 115-*a* may select M beam switches of the set of N beam switches which are first in time and may retain the $M^{th}$ beam for the remaining N-M beams switches indicating via the first beam switching configuration. In some examples, the UE 115-*a* may select any M-fold permutation of beam switches to perform out of the set of N beam switches indicated via the first beam switching configuration. For example, the UE 115-*a* may select any permutation of beam switches of the set of N beam switches such that the permutation includes M beam switches. In some implementations, the UE 115-*a* may select a subset of beam switches based on which beams give a highest channel metric (e.g., RSRP) which may improve channel performance. In some examples, the UE 115-*a* may determine that an actual beam switching capability of the UE 115-*a* (e.g., based on utilized antenna panels, antenna chains, radio frequency integrated circuits, etc.) exceeds the indicated beam switching capability such that the UE 115-*a* may perform each beam switch of the set of beam switches indicated via the first beam switching configuration. In some examples, the UE 115-*a* may select a most recently used beam, or a beam used to receive the scheduling control information. The UE 115-*a* may select a beam used for physical sidelink control channel (PSCCH) or PSSCH transmission. In some examples, there may be a gap between PSCCH and PSSCH transmissions and the UE 115-*a* may select the beam of the scheduling control information or the most recently used beam as a default.

In some examples, the UE 115-*a* may determine the second beam switching configuration according to an indicated set of selection rules. For example, the base station 105-*a* may indicate (e.g., via a scheduling grant, a configured grant, a beam switching command in DCI or a MAC control element (MAC-CE), or via equivalent sidelink control signaling) to the UE 115-*a* to apply a set of selection rules (e.g., such that the selection rules may be indicated by the base station 105 or may be predetermined). Additionally, or alternatively, the UE 115-*a* may apply selection rules autonomously such that the base station 105-*a* may determine a set of hypotheses (e.g., predicting one or more hypotheses of beam switches the UE 115-*a* may perform) and may process the set of shared channel transmissions 220 accordingly. The base station 105 and the UE 115-*a* may communicate via the set of shared channel transmissions 220 according to the beam switching configurations.

In some implementations, if the UE 115-*a* or the base station 105-*a* include multiple transmission/reception points (TRPs), the UE 115-*a* or the base station 105-*a* may apply the selection rules to determine beams for each TRP. For example, there may exist multiple default beams (e.g., one for each TRP) or the UE 115-*a* and the base station 105-*a* may communicate via multiple concurrent beams. Similarly, in some examples, TCI states may be applied to uplink and downlink communications such that UE 115-*a* and the base station 105-*a* may select beam switches for uplink and downlink communications based on applying selection rules to a unified TCI state. Implementing aspects of the wireless communications system 200 may lead to a reduced signaling overhead, a more efficient resource utilization, or an improved coordination between devices, among other benefits.

Figure 3:
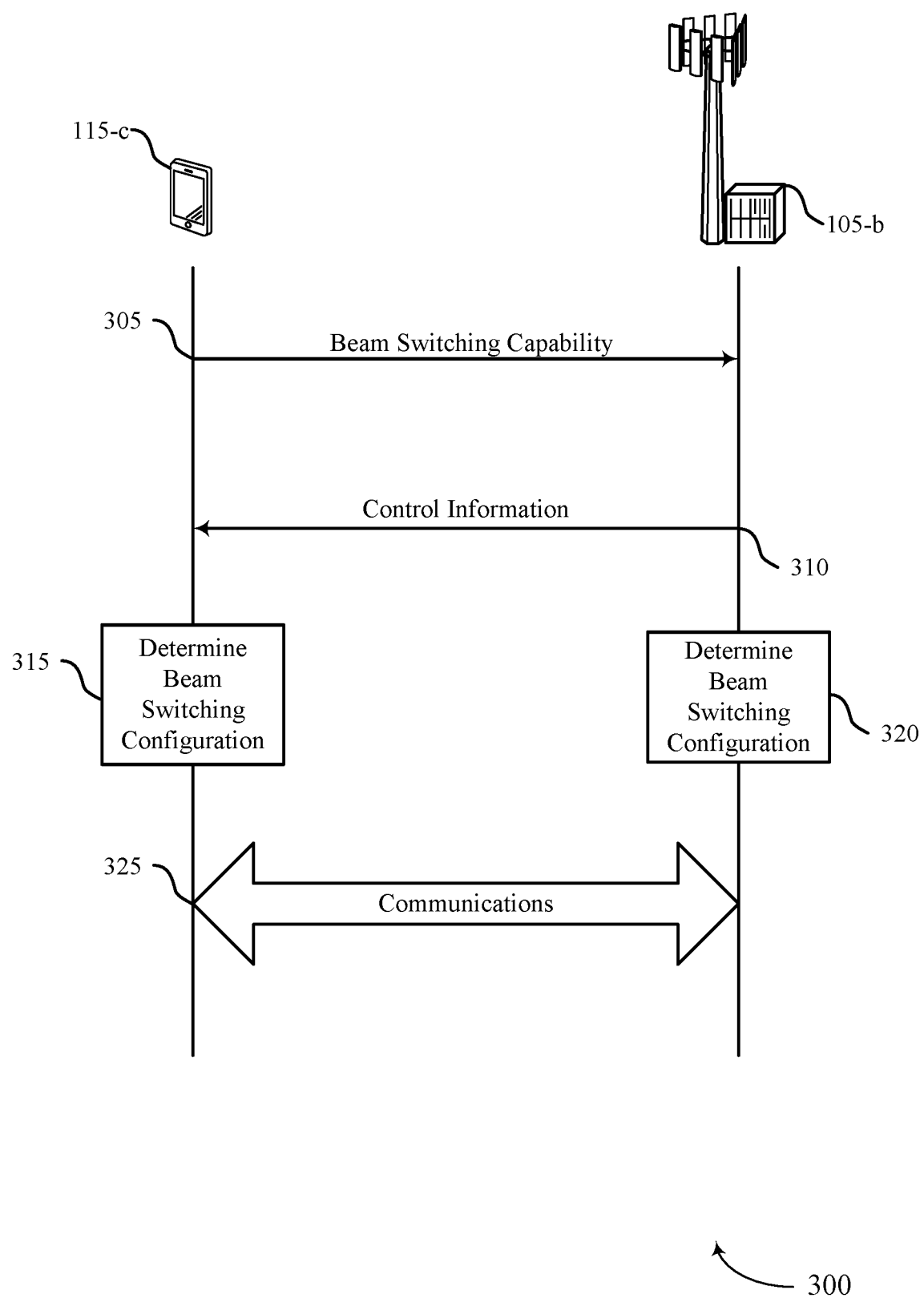
FIG. 3 illustrates an example of a process flow in a system that supports techniques for beam switching in wireless communications systems in accordance with aspects of the present disclosure.

FIG. 3 illustrates an example of a process flow 300 in a system that supports techniques for beam switching in wireless communications systems, in accordance with aspects of the present disclosure. In some examples, the process flow 300 may be implemented by aspects of a wireless communications 100 or a wireless communications system 200, as described with reference to FIGS. 1 and 2. The process flow 300 may include a UE 115-*c* and a base station 105-*b* which may be examples of the corresponding devices described herein. Alternative examples of the following may be implemented in which some processes are performed in a different order than described or are not performed at all. In some examples, the processes may include additional features not mentioned below, or further processes may be added.

At 305, the UE 115-*c* may transmit an indication of a beam switching capability to the base station 105-*b*. The beam switching capability may indicate a radio frequency settling time, a quasi co-location time, or a number of beam switches which the UE 115-*c* is capable to perform within a time period (e.g., with a slot or between slots).

At 310, the base station 105-*b* may transmit control information to the UE 115-*c* scheduling resources for a set of shared channel transmissions (e.g., PDSCH, PUSCH, or PSSCH transmissions) according to a first beam switching configuration. For example, the base station 105-*b* may indicate the UE 115-*c* to perform a set of beam switches associated with the set of shared channel transmissions. The control information may be communicated via, for example, a scheduling grant in DCI (e.g., which may schedule uplink resources, downlink resources, or both uplink and downlink resources), configuration of a configured grant (e.g., via MAC-CE or RRC signaling), or an explicit beam switch command (e.g., in a MAC-CE or DCI). Explicit beam switch commands may include spatial-relations or TCI states for downlink or uplink resources. In some cases, the first beam switching configuration may be sent by another UE in sidelink control information over a sidelink channel (e.g., PSCCH or PSSCH), and may include a scheduling grant, configuration of a configured grant, or explicit beam switch command.

At 315, the UE 115-*c* may determine a second beam switching configuration according to a set of selection rules. For example, the UE 115-*b* may determine a subset of the set of indicated beam switches based on an actual capability of the UE 115-*c* which may be different from the reported beam switching capability. In some examples, the UE 115-*c* may determine to perform each beam switch of the set of indicated beam switches according to the actual capability of the UE 115-*c*.

At 310, the base station 105-*b* may determine a third beam switching configuration according to the set of selection rules. In some examples, the base station 105-*a* may indicate the UE 115-*c* to apply predetermined selection rules and the base station 105-*b* may apply the same selection rules (e.g., such that the third beam switching configuration is similar to or the same as the second beam switching configuration). In some examples, if the UE 115-*c* is configured to autonomously apply selection rules, the base station 105-*b* may determine a set of beam switching configuration hypotheses (e.g., predicting which beam switches the UE 115-*c* may perform) and may process the shared channel transmission accordingly. For example, the base station 105-*b* may process the shared channel transmission according to more than one of the set of beam switching configuration hypotheses (e.g., each of the set, or testing each of the set until the shared channel transmission is communicated successfully).

At 325, the base station 105-*b* and the UE 115-*c* may communicate via the set of shared channel transmissions according to the second beam switching configuration, the third beam switching configuration, or the set of beam switching configuration hypotheses. Implementing aspects of the process flow 300 may lead to a reduced signaling overhead, a more efficient resource utilization, or an improved coordination between devices, among other benefits. Although the process flow 300 is described as performed for beam switching for shared channel transmissions between base station 105-*b* and UE 115-*c*, aspects of the process flow 300 may occur via a sidelink with a second UE (not shown).

Figure 4:
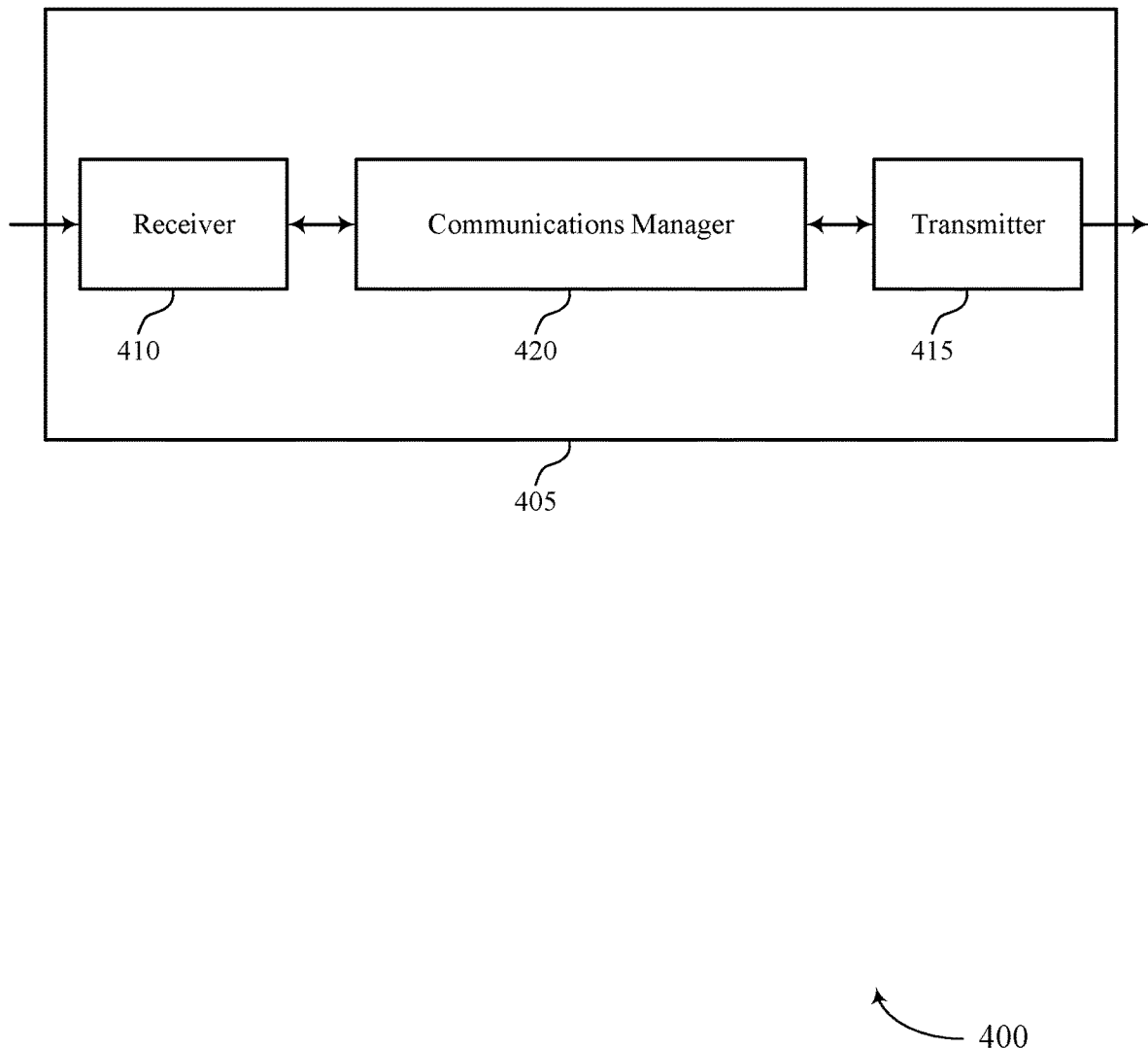
FIGS. 4 and 5 show block diagrams of devices that support techniques for beam switching in wireless communications systems in accordance with aspects of the present disclosure.

FIG. 4 shows a block diagram 400 of a device 405 that supports techniques for beam switching in wireless communications systems in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for beam switching in wireless communications systems). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for beam switching in wireless communications systems). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for beam switching in wireless communications systems as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first device in accordance with examples as disclosed herein. For example, the communications manager 420 may be configured as or otherwise support a means for transmitting, to a second device, an indication of a beam switching capability of the first device. The communications manager 420 may be configured as or otherwise support a means for receiving, from the second device, control information scheduling resources for communicating via a set of shared channel transmissions, the resources based on a first beam switching configuration, the first beam switching configuration exceeding the beam switching capability of the first device. The communications manager 420 may be configured as or otherwise support a means for determining a second beam switching configuration based on applying at least one selection rule to the first beam switching configuration. The communications manager 420 may be configured as or otherwise support a means for communicating via the set of shared channel transmissions over the scheduled resources based on the second beam switching configuration.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for beam switching in wireless communications systems such that the device 405 may exhibit a reduced latency, a more efficient resource utilization, improved coordination between devices, or a reduced signaling overhead, among other benefits.

Figure 5:
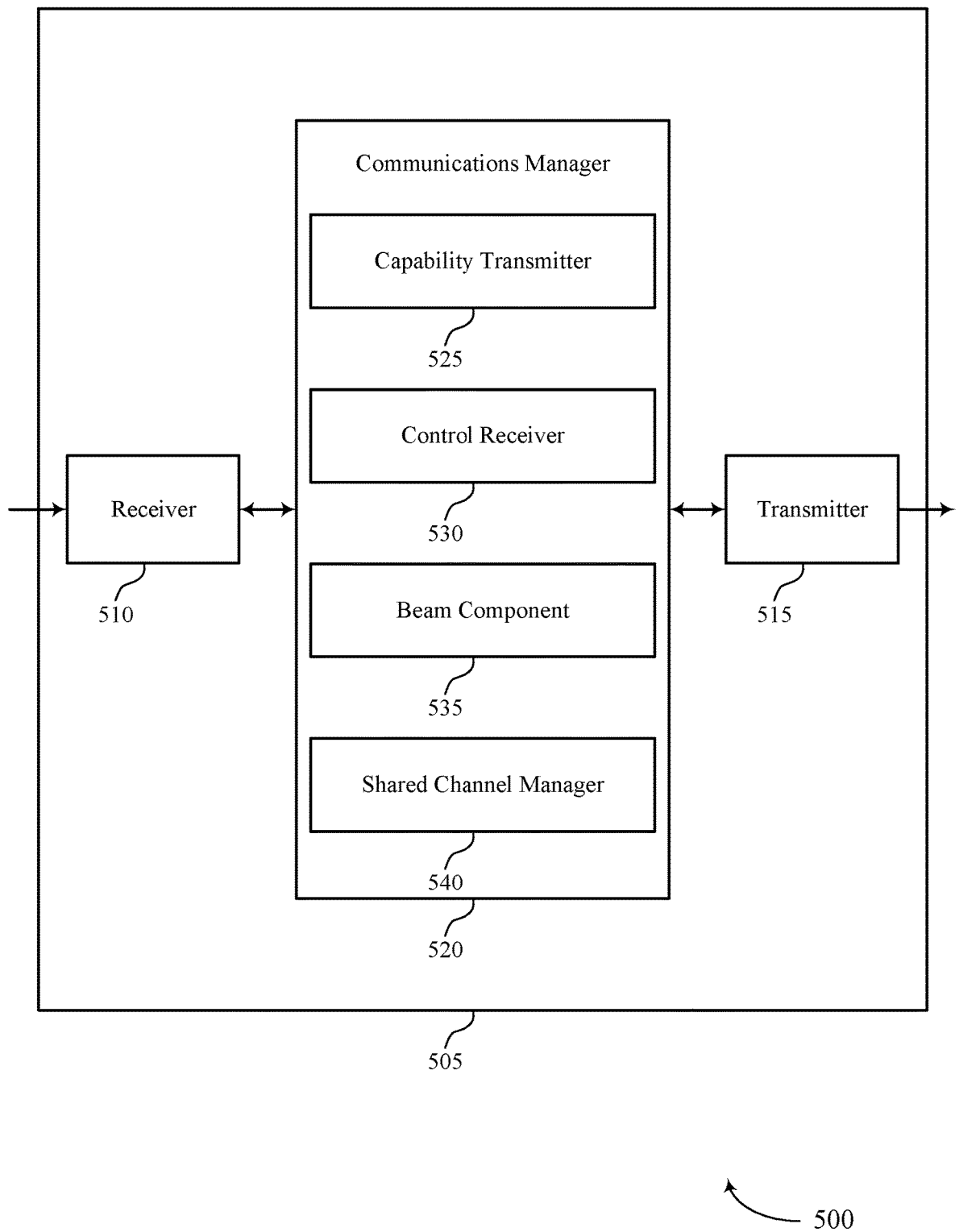

FIG. 5 shows a block diagram 500 of a device 505 that supports techniques for beam switching in wireless communications systems in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for beam switching in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for beam switching in wireless communications systems). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for beam switching in wireless communications systems as described herein. For example, the communications manager 520 may include a capability transmitter 525, a control receiver 530, a beam component 535, a shared channel manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device in accordance with examples as disclosed herein. The capability transmitter 525 may be configured as or otherwise support a means for transmitting, to a second device, an indication of a beam switching capability of the first device. The control receiver 530 may be configured as or otherwise support a means for receiving, from the second device, control information scheduling resources for communicating via a set of shared channel transmissions, the resources based on a first beam switching configuration, the first beam switching configuration exceeding the beam switching capability of the first device. The beam component 535 may be configured as or otherwise support a means for determining a second beam switching configuration based on applying at least one selection rule to the first beam switching configuration. The shared channel manager 540 may be configured as or otherwise support a means for communicating via the set of shared channel transmissions over the scheduled resources based on the second beam switching configuration.

Figure 6:
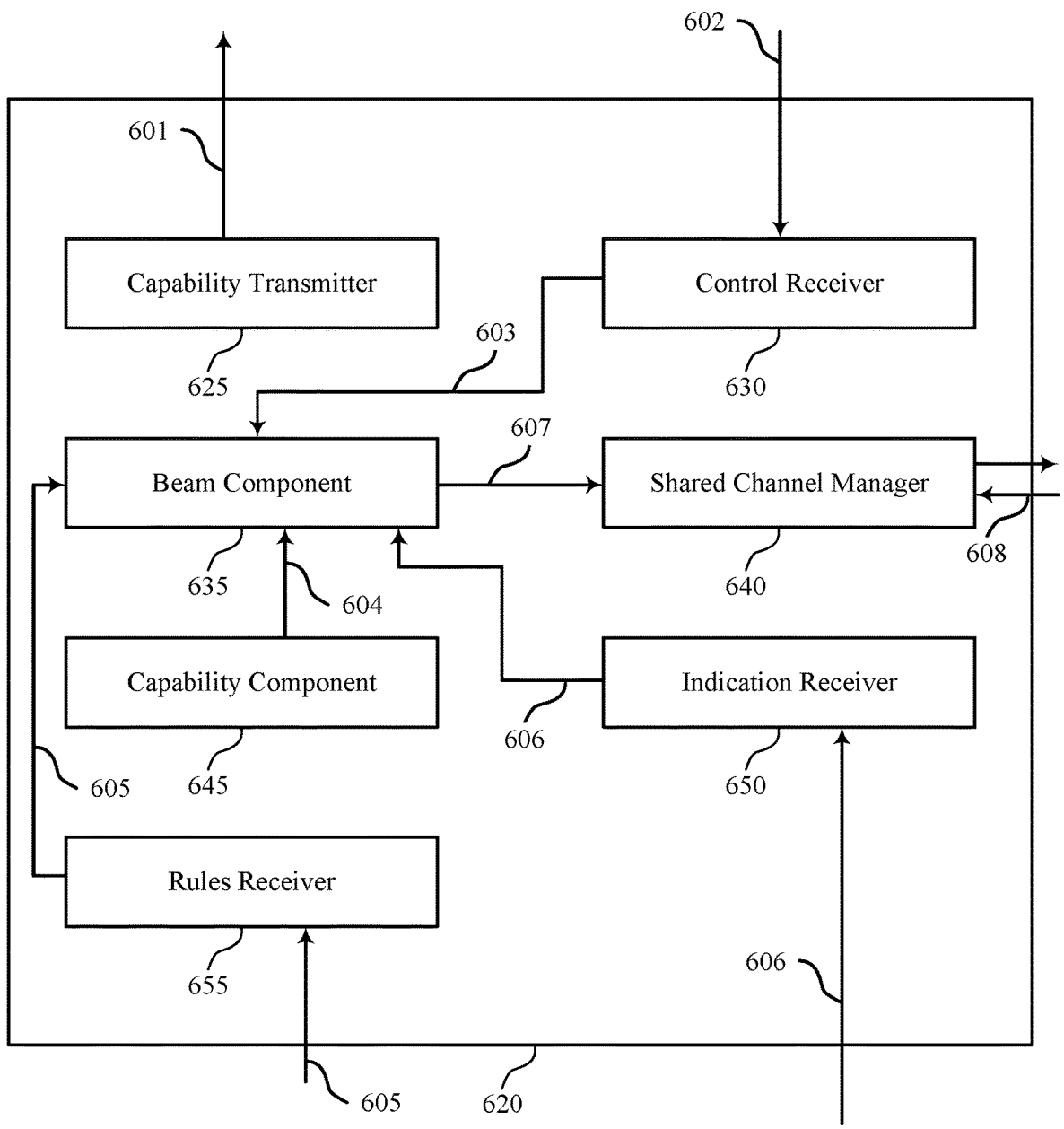
FIG. 6 shows a block diagram of a communications manager that supports techniques for beam switching in wireless communications systems in accordance with aspects of the present disclosure.

FIG. 6 shows a block diagram 600 of a communications manager 620 that supports techniques for beam switching in wireless communications systems in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for beam switching in wireless communications systems as described herein. For example, the communications manager 620 may include a capability transmitter 625, a control receiver 630, a beam component 635, a shared channel manager 640, a capability component 645, an indication receiver 650, a rules receiver 655, or any combination thereof. Each of these components may communicate, directly or indirectly, with one another (e.g., via one or more buses).

The communications manager 620 may support wireless communication at a first device in accordance with examples as disclosed herein. The capability transmitter 625 may be configured as or otherwise support a means for transmitting, to a second device, an indication 601 of a beam switching capability of the first device. For example, the capability transmitter 625 may transmit the indication 601 via the transmitter 515, as described with reference to FIG. 5.

The control receiver 630 may be configured as or otherwise support a means for receiving, from the second device, control information 602 scheduling resources for communicating via a set of shared channel transmissions 608, the resources based on a first beam switching configuration 6033, the first beam switching configuration 603 exceeding the beam switching capability 601 of the first device. For example, the control receiver 630 may obtain the control information 602 from the receiver 510, as described with reference to FIG. 5.

The beam component 635 may obtain the first beam switching configuration 603 from the control receiver 603. As such, the beam component 635 may be configured as or otherwise support a means for determining a second beam switching configuration based on applying at least one selection rule to the first beam switching configuration 603. In some examples, the beam component 635 may obtain an actual beam switching capability 605 from the capability component 645, a set of selection rules 605 from the rules receiver 655, or an indication 606 from the indication receiver 650 that the beam component 625 is to apply the set of selection rules 605.

The shared channel manager 640 may be configured as or otherwise support a means for communicating via the set of shared channel transmissions 608 over the scheduled resources based on the second beam switching configuration 607. For example, the shared channel manager 640 may obtain the second beam switching configuration 607 from the beam component 635 and may transmit or receive a set of shared channel transmissions 608 via the receiver 510 or the transmitter 515, as described with reference to FIG. 5.

In some examples, to support applying the at least one selection rule, the beam component 635 may be configured as or otherwise support a means for determining a subset of a set of beam switches associated with the first beam switching configuration 603 according to a predetermined selection rule, where the second beam switching configuration 607 includes the subset of the set of beam switches.

In some examples, the first beam switching configuration 603 includes a set of N beam switches. In some examples, the beam switching capability of the first device includes a capability to perform M beam switches.

In some examples, the beam component 635 may be configured as or otherwise support a means for selecting M beam switches that are first in time of the set of N beam switches of the first beam switching configuration 603. In some examples, the beam component 635 may be config-
ured as or otherwise support a means for selecting the $M^{th}$ beam for the N-M other beam switches of the set of N beam switches of the first beam switching configuration 603, where the second beam switching configuration 607 is based on selecting the M beam switches and selecting the $M^{th}$ beam for the N-M other beam switches.

In some examples, the beam component 635 may be configured as or otherwise support a means for selecting an M-fold permutation of the set of N beam switches of the first beam switching configuration 603, where the second beam switching configuration 607 includes the M-fold permutation.

In some examples, to support applying the at least one selection rule, the capability component 645 may be configured as or otherwise support a means for determining an actual beam switching capability 604 of the first device, the actual beam switching capability 604 different from the indicated beam switching capability 601. In some examples, to support applying the at least one selection rule, the beam component 635 may be configured as or otherwise support a means for determining a set of beam switches associated with the first beam switching configuration 603 based on the actual beam switching capability 604, where the second beam switching configuration 607 includes the set of beam switches.

In some examples, determining the actual beam switching capability 604 is based on a correspondence between a set of antenna components of the first device and the set of beam switches associated with the first beam switching configuration.

In some examples, to support applying the at least one selection rule, the beam component 635 may be configured as or otherwise support a means for determining respective performance metrics for a set of beam switches associated with the first beam switching configuration 603. In some examples, to support applying the at least one selection rule, the beam component 635 may be configured as or otherwise support a means for determining a subset of the set of beam switches associated with the first beam switching configuration 603 based on the respective performance metrics, where the second beam switching configuration 607 includes the subset of the set of beam switches.

In some examples, to support determining the respective performance metrics, the beam component 635 may be configured as or otherwise support a means for determining a reference signal received power (RSRP) associated with each beam switch of the set of beam switches associated with the first beam switching configuration 603.

In some examples, to support applying the at least one selection rule, the beam component 635 may be configured as or otherwise support a means for determining a beam associated with receiving the control information 602, where the second beam switching configuration 607 includes the beam associated with receiving the control information 602.

In some examples, to support applying the at least one selection rule, the beam component 635 may be configured as or otherwise support a means for determining a beam associated with a sidelink with a third device, where the second beam switching configuration 607 includes the beam associated with the sidelink.

In some examples, applying the at least one selection rule includes determining a most recently used beam different from a beam associated with receiving the control information 602. In some examples, the second beam switching configuration 607 includes the most recently used beam.

In some examples, the indication receiver 650 may be configured as or otherwise support a means for receiving an indication 606 that the first device is to apply the at least one selection rule, where determining the second beam switching configuration 607 is based on the receiving the indication 606 that the first device is to apply the at least one selection rule. For example, the indication receiver 650 may obtain the indication 606 from the receiver 510, as described with reference to FIG. 5.

In some examples, to support receiving the indication 606 that the first device is to apply the at least one selection rule, the indication receiver 650 may be configured as or otherwise support a means for receiving the indication 606 that the first device is to apply the at least one selection rule via DCI of a scheduling grant, a configured grant, a beam switching command in a MAC-CE or DCI, or via sidelink control signaling.

In some examples, the rules receiver 655 may be configured as or otherwise support a means for receiving an indication of a set of selection rules 605, where the set of selection rules 605 includes the at least one selection rule. For example, the rules receiver 655 may obtain the set of selection rules 605 from the receiver 510, as described with reference to FIG. 5.

In some examples, the control receiver 630 may be configured as or otherwise support a means for receiving an indication of a set of beam switches the first device is to perform for communicating via the set of shared channel transmissions, the set of beam switches associated with concurrent beams associated with two or more transmission reception points of the first device.

Figure 7:
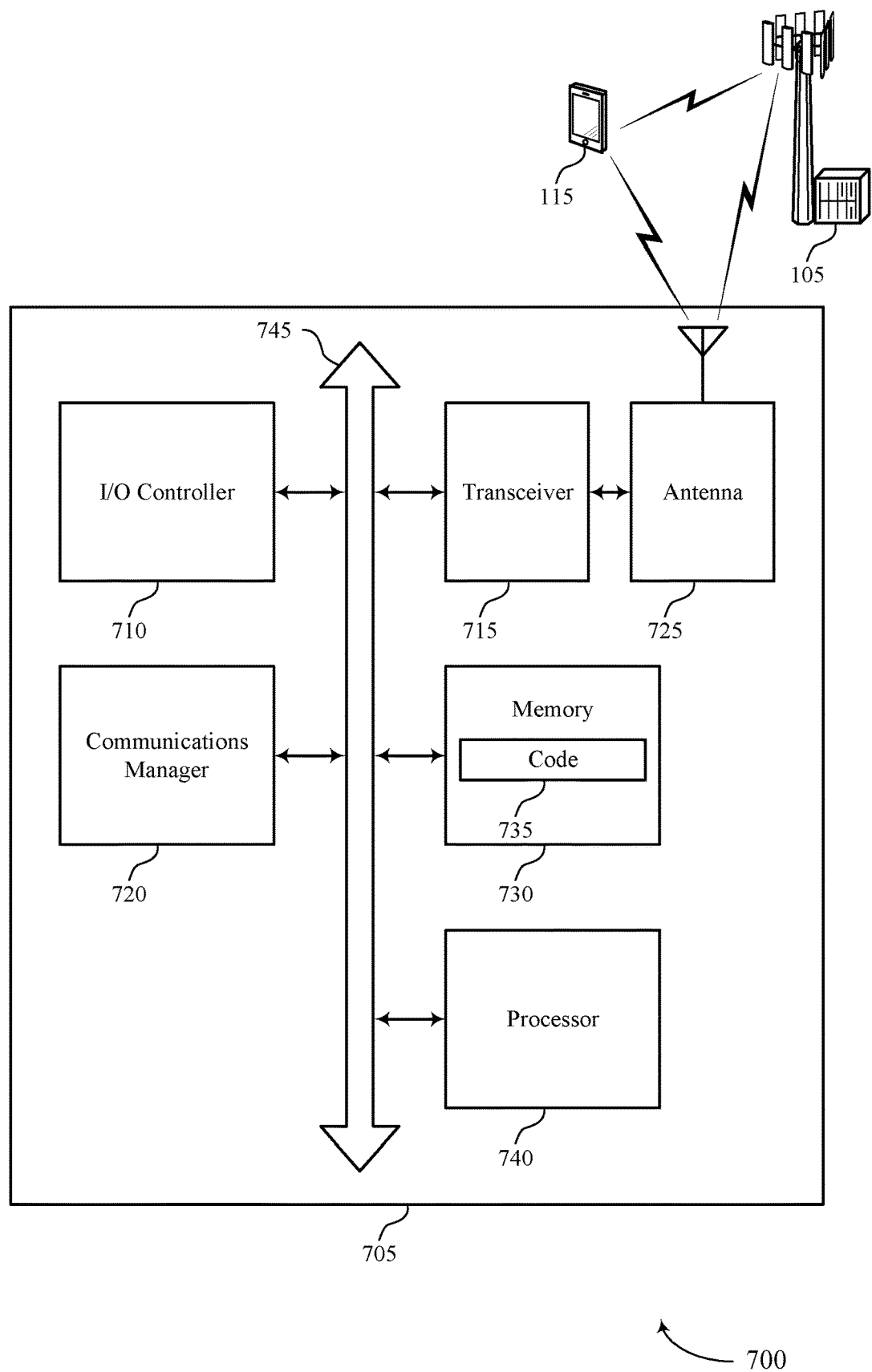
FIG. 7 shows a diagram of a system including a device that supports techniques for beam switching in wireless communications systems in accordance with aspects of the present disclosure.

FIG. 7 shows a diagram of a system 700 including a device 705 that supports techniques for beam switching in wireless communications systems in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for beam switching in wireless communications systems). For example, the device 705 or a component of the device 705 may include a processor 740 and memory 730 coupled to the processor 740, the processor 740 and memory 730 configured to perform various functions described herein.

The communications manager 720 may support wireless communication at a first device in accordance with examples as disclosed herein. For example, the communications manager 720 may be configured as or otherwise support a means for transmitting, to a second device, an indication of a beam switching capability of the first device. The communications manager 720 may be configured as or otherwise support a means for receiving, from the second device, control information scheduling resources for communicating via a set of shared channel transmissions, the resources based on a first beam switching configuration, the first beam switching configuration exceeding the beam switching capability of the first device. The communications manager 720 may be configured as or otherwise support a means for determining a second beam switching configuration based on applying at least one selection rule to the first beam switching configuration. The communications manager 720 may be configured as or otherwise support a means for communicating via the set of shared channel transmissions over the scheduled resources based on the second beam switching configuration.

By including or configuring the communications manager 720 in accordance with examples as described herein, the device 705 may support techniques for beam switching in wireless communications systems such that the device 705 may exhibit a reduced latency, a more efficient resource utilization, improved coordination between devices, or a reduced signaling overhead, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for beam switching in wireless communications systems as described herein, or the processor 740 and the memory 730 may be otherwise configured to perform or support such operations.

Figure 8:
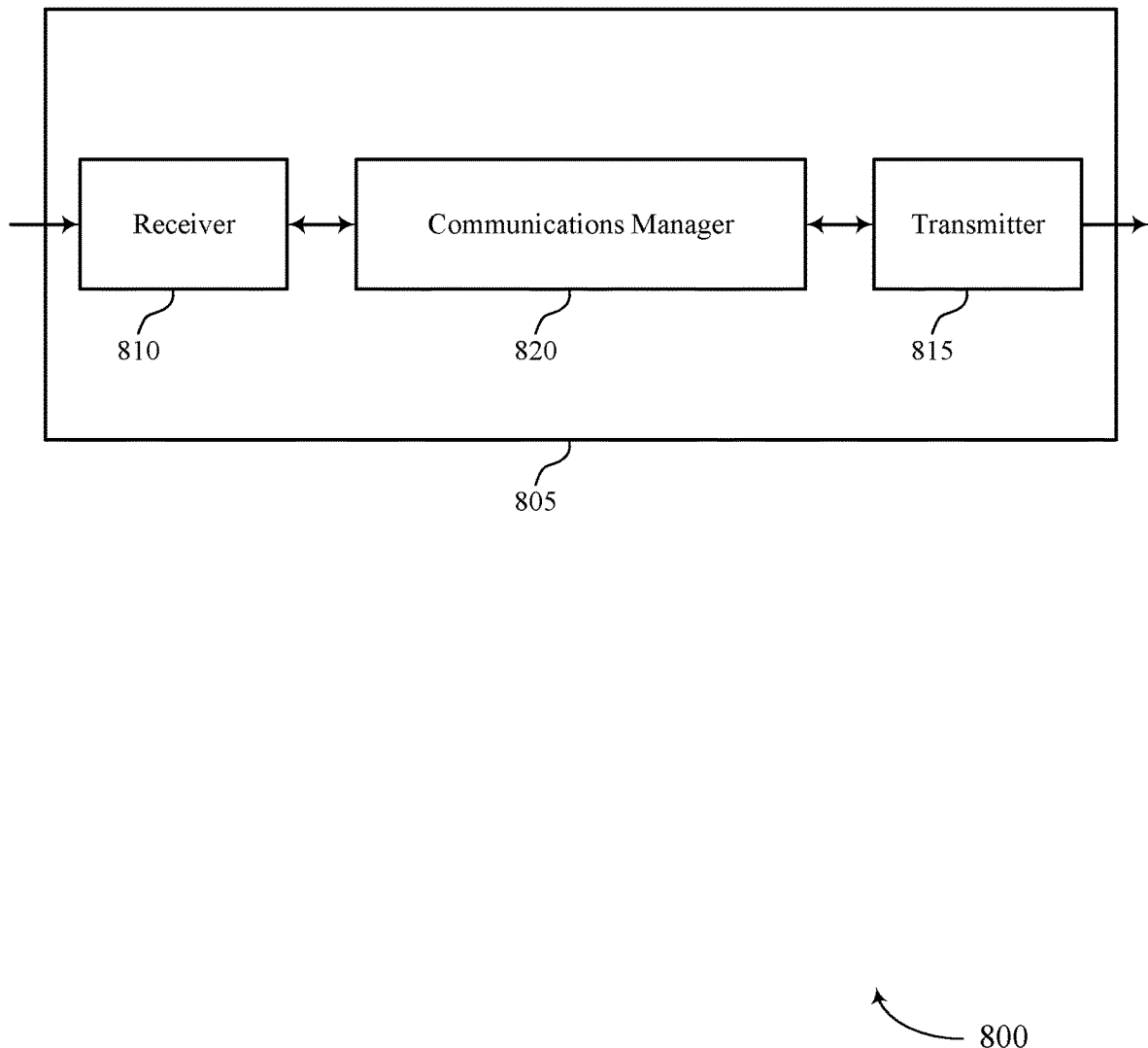
FIGS. 8 and 9 show block diagrams of devices that support techniques for beam switching in wireless communications systems in accordance with aspects of the present disclosure.

FIG. 8 shows a block diagram 800 of a device 805 that supports techniques for beam switching in wireless communications systems in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for beam switching in wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for beam switching in wireless communications systems). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for beam switching in wireless communications systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first device in accordance with examples as disclosed herein. For example, the communications manager 820 may be configured as or otherwise support a means for receiving, from a second device, an indication of a beam switching capability of the second device. The communications manager 820 may be configured as or otherwise support a means for transmitting, to the second device, control information scheduling resources for communicating via a set of shared channel transmissions, the resources based on a first beam switching configuration, the first beam switching configuration exceeding the beam switching capability of the second device. The communications manager 820 may be configured as or otherwise support a means for determining a second beam switching configuration based on applying at least one selection rule to the first beam switching configuration. The communications manager 820 may be configured as or otherwise support a means for communicating via the set of shared channel transmissions over the scheduled resources based on the second beam switching configuration.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for beam switching in wireless communications systems such that the device 805 may exhibit a reduced latency, a more efficient resource utilization, improved coordination between devices, or a reduced signaling overhead, among other benefits.

Figure 9:
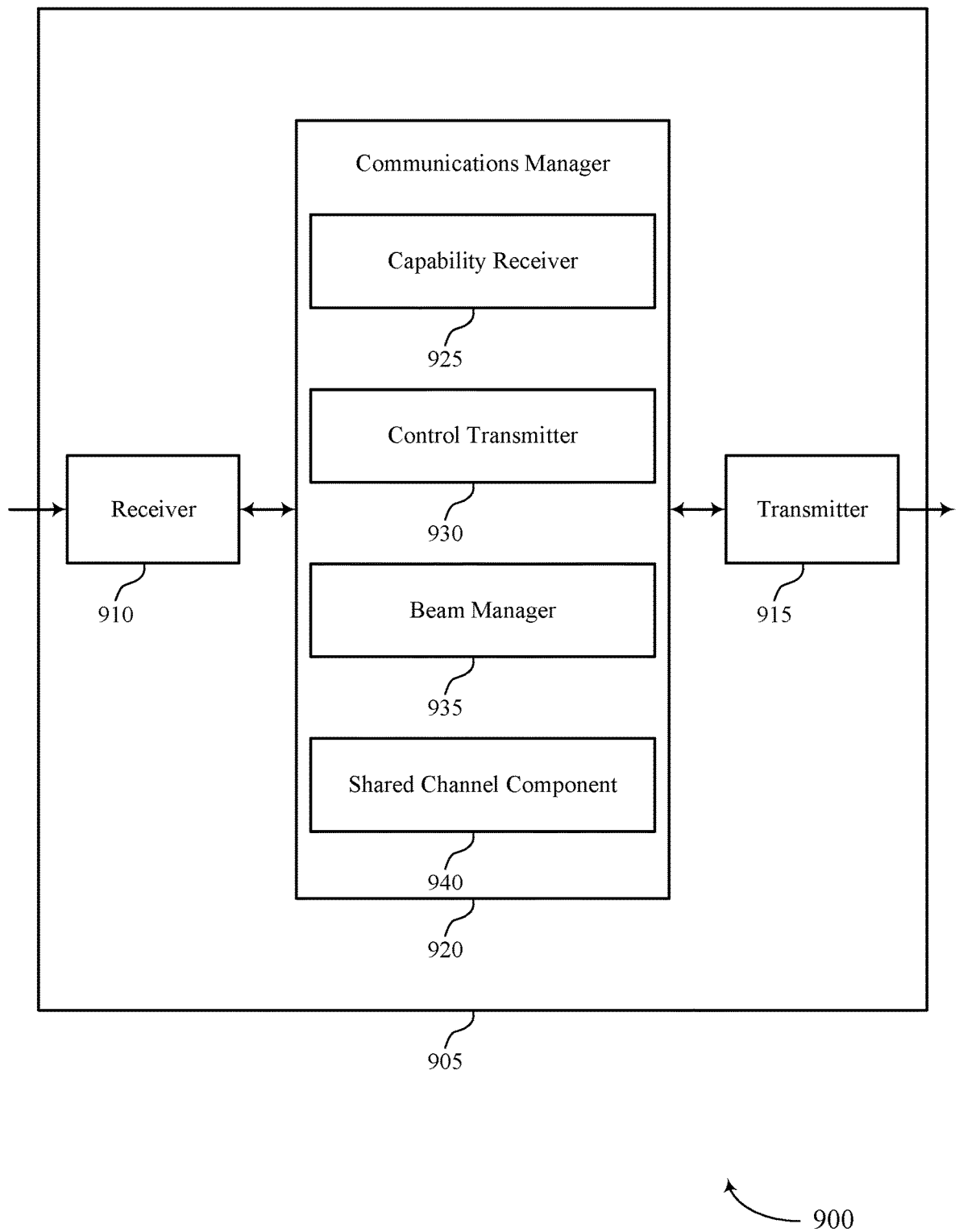

FIG. 9 shows a block diagram 900 of a device 905 that supports techniques for beam switching in wireless communications systems in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for beam switching in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for beam switching in wireless communications systems). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for beam switching in wireless communications systems as described herein. For example, the communications manager 920 may include a capability receiver 925, a control transmitter 930, a beam manager 935, a shared channel component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first device in accordance with examples as disclosed herein. The capability receiver 925 may be configured as or otherwise support a means for receiving, from a second device, an indication of a beam switching capability of the second device. The control transmitter 930 may be configured as or otherwise support a means for transmitting, to the second device, control information scheduling resources for communicating via a set of shared channel transmissions, the resources based on a first beam switching configuration, the first beam switching configuration exceeding the beam switching capability of the second device. The beam manager 935 may be configured as or otherwise support a means for determining a second beam switching configuration based on applying at least one selection rule to the first beam switching configuration. The shared channel component 940 may be configured as or otherwise support a means for communicating via the set of shared channel transmissions over the scheduled resources based on the second beam switching configuration.

Figure 10:
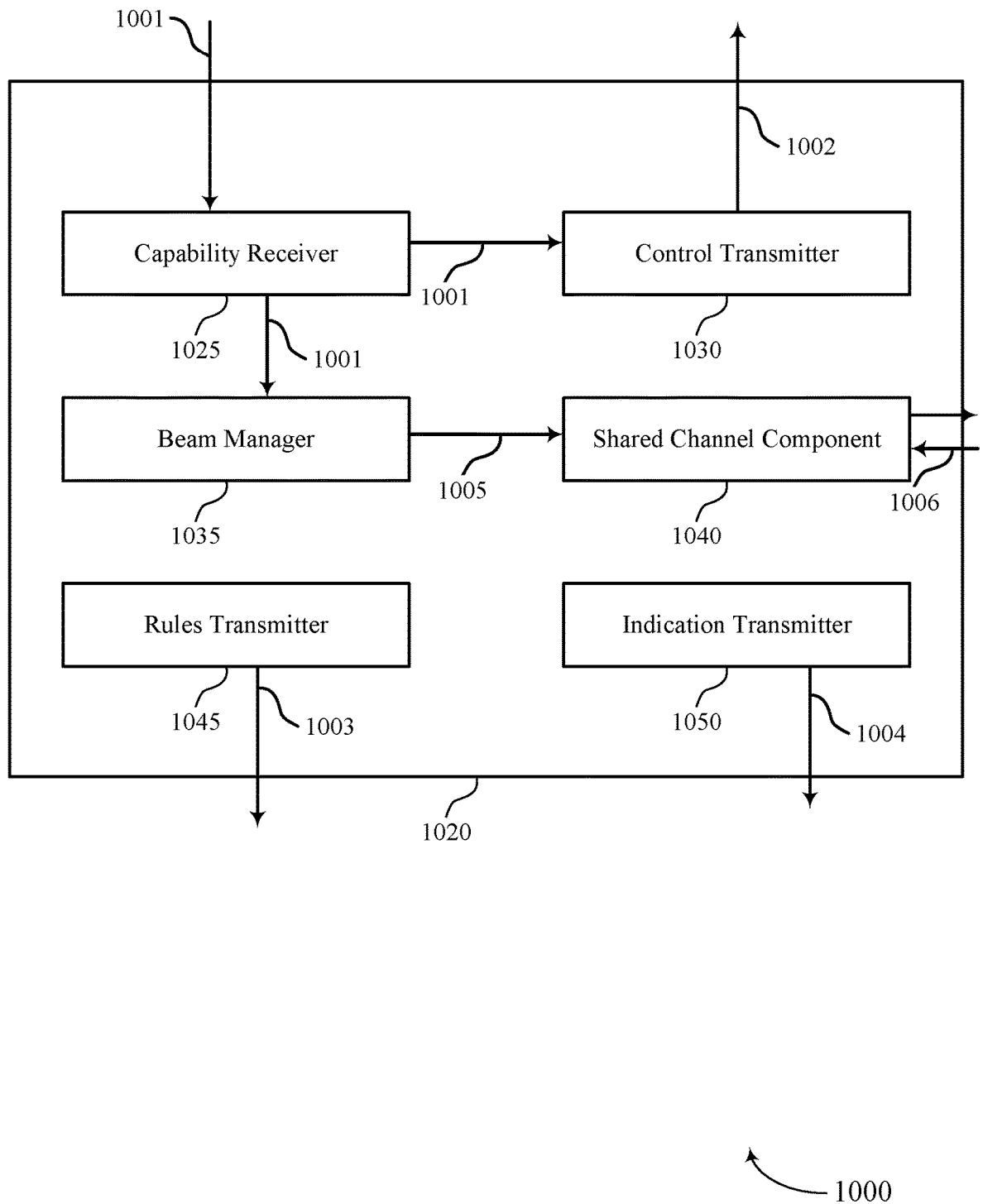
FIG. 10 shows a block diagram of a communications manager that supports techniques for beam switching in wireless communications systems in accordance with aspects of the present disclosure.

FIG. 10 shows a block diagram 1000 of a communications manager 1020 that supports techniques for beam switching in wireless communications systems in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for beam switching in wireless communications systems as described herein. For example, the communications manager 1020 may include a capability receiver 1025, a control transmitter 1030, a beam manager 1035, a shared channel component 1040, a rules transmitter 1045, an indication transmitter 1050, or any combination thereof. Each of these components may communicate, directly or indirectly, with one another (e.g., via one or more buses).

The communications manager 1020 may support wireless communication at a first device in accordance with examples as disclosed herein. The capability receiver 1025 may be configured as or otherwise support a means for receiving, from a second device, an indication of a beam switching capability 1001 of the second device. For example, the capability receiver 1025 may obtain the indication of the beam switching capability 1001 from the receiver 910, as described with reference to FIG. 9.

The control transmitter 1030 may be configured as or otherwise support a means for transmitting, to the second device, control information 1002 scheduling resources for communicating via a set of shared channel transmissions 1006, the resources based on a first beam switching configuration, the first beam switching configuration exceeding the beam switching capability 1001 of the second device. In some examples, the control transmitter 1030 may obtain the beam switching capability 1001 from the capability receiver 105. The control transmitter 1030 may transmit the control information 1002 via the transmitter 915, as described with reference to FIG. 9.

The beam manager 1035 may be configured as or otherwise support a means for determining a second beam switching configuration 1005 based on applying at least one selection rule to the first beam switching configuration. In some examples, the beam manager 1035 may obtain the beam switching capability 1001 of the second device from the capability receiver 1025 such that applying the at least one selection rule is based on the beam switching capability 1001.

The shared channel component 1040 may be configured as or otherwise support a means for communicating via the set of shared channel transmissions 1006 over the scheduled resources based on the second beam switching configuration 1005. For example, the shared channel component 1040 may obtain the second beam switching configuration 1005 from the beam manager 1035 and may transmit or receive the set of shared channel transmissions 1006 via the receiver 910 or the transmitter 915, as described with reference to FIG. 9.

In some examples, to support applying the at least one selection rule, the beam manager 1035 may be configured as or otherwise support a means for determining a sequential subset of a set of beam switches associated with the first beam switching configuration, where the second beam switching configuration 1005 includes the sequential subset of the set of beam switches.

In some examples, to support applying the at least one selection rule, the beam manager 1035 may be configured as or otherwise support a means for determining a subset of a set of beam switches associated with the first beam switching configuration according to a predetermined selection rule, where the second beam switching configuration 1005 includes the subset of the set of beam switches.

In some examples, to support applying the at least one selection rule, the beam manager 1035 may be configured as or otherwise support a means for determining respective performance metrics for a set of beam switches associated with the first beam switching configuration. In some examples, to support applying the at least one selection rule, the beam manager 1035 may be configured as or otherwise support a means for determining a subset of the set of beam switches associated with the first beam switching configuration based on determining the respective performance metrics, where the second beam switching configuration 1005 includes the subset of the set of beam switches.

In some examples, to support determining the respective performance metrics, the beam manager 1035 may be configured as or otherwise support a means for determining a reference signal received power (RSRP) for each beam switch of the set of beam switches associated with the first beam switching configuration.

In some examples, to support applying the at least one selection rule, the beam manager 1035 may be configured as or otherwise support a means for determining a beam associated with transmitting the control information, where the second beam switching configuration 1005 includes the beam associated with transmitting the control information.

In some examples, to support applying the at least one selection rule, the beam manager 1035 may be configured as or otherwise support a means for determining a most recently used beam different from a beam associated with receiving the control information, where the second beam switching configuration 1005 the most recently used beam.

In some examples, the rules transmitter 1045 may be configured as or otherwise support a means for transmitting an indication of a set of selection rules 1003, where the set of selection rules 1003 includes the at least one selection rule. For example, the rules transmitter 1045 may transmit the set of selection rules 1003 via the transmitter 915, as described with reference to FIG. 9.

In some examples, the indication transmitter 1050 may be configured as or otherwise support a means for transmitting an indication 1004 that the second device is to apply the at least one selection rule, where determining the second beam switching configuration 1005 is based on the transmitting the indication 1004 that the second device is to apply the at least one selection rule. In some implementations, the indication transmitter 1050 may transmit the indication 1004 via the transmitter 915, as described with reference to FIG. 9.

In some examples, to support transmitting the indication 1004 that the second device is to apply the at least one selection rule, the indication transmitter 1050 may be configured as or otherwise support a means for transmitting the indication 1004 that the second device is to apply the at least one selection rule via DCI of a scheduling grant, a configured grant, a beam switching command in a MAC-CE or DCI, or via sidelink control signaling.

In some examples, to support determining the second beam switching configuration 1005, the beam manager 1035 may be configured as or otherwise support a means for processing the set of shared channel transmissions 1006 according to a set of multiple beam switching configuration hypotheses. In some examples, to support determining the second beam switching configuration 1005, the beam manager 1035 may be configured as or otherwise support a means for determining the second beam switching configuration 1005 from among the set of multiple beam switching configuration hypotheses based on the processing.

In some examples, the control transmitter 1030 may be configured as or otherwise support a means for transmitting an indication of a set of beam switches the first device is to perform for communicating via the set of shared channel transmissions, the set of beam switches associated with concurrent beams associated with two or more transmission reception points of the first device.

Figure 11:
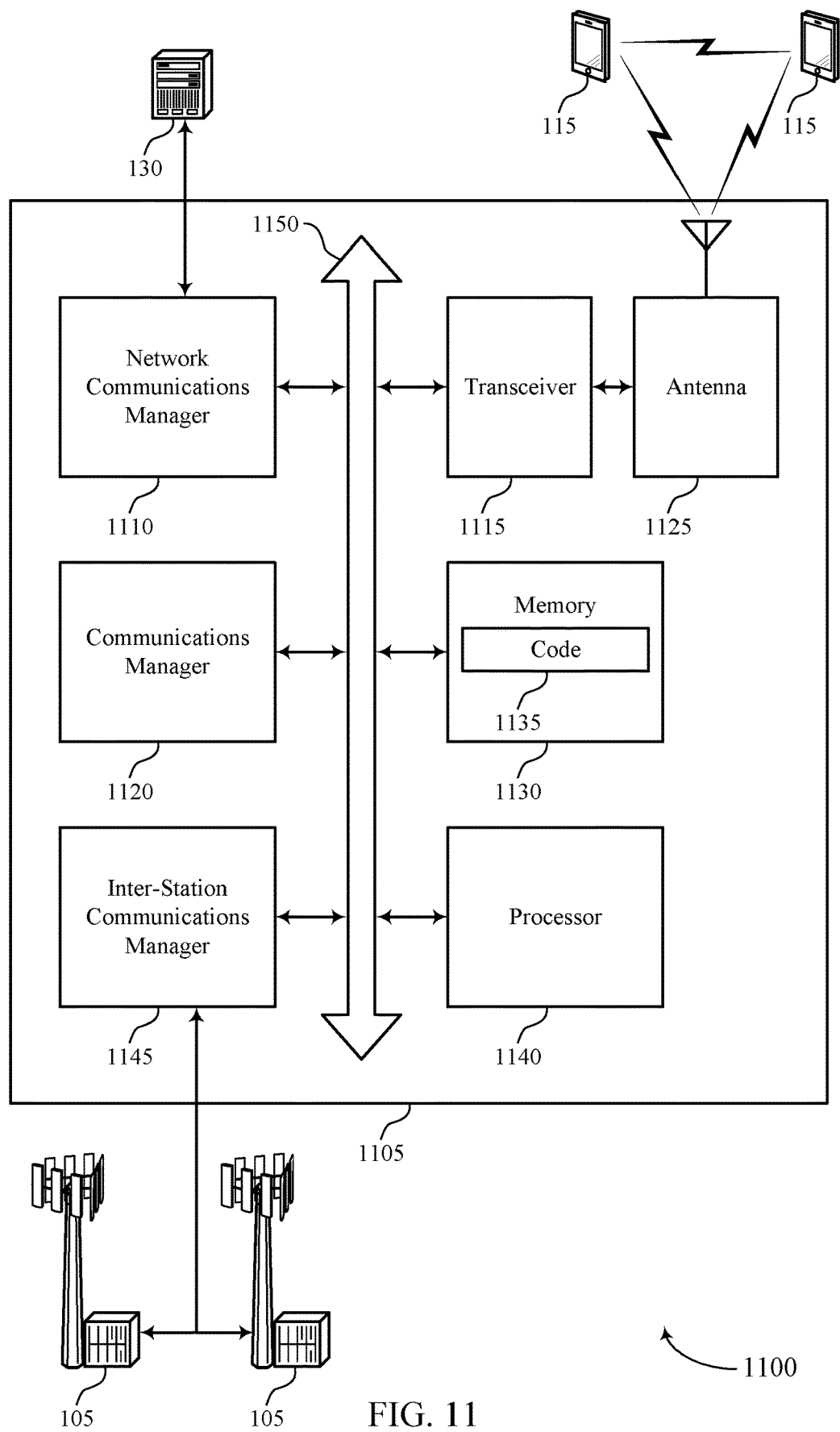
FIG. 11 shows a diagram of a system including a device that supports techniques for beam switching in wireless communications systems in accordance with aspects of the present disclosure.

FIG. 11 shows a diagram of a system 1100 including a device 1105 that supports techniques for beam switching in wireless communications systems in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for beam switching in wireless communications systems). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a first device in accordance with examples as disclosed herein. For example, the communications manager 1120 may be configured as or otherwise support a means for receiving, from a second device, an indication of a beam switching capability of the second device. The communications manager 1120 may be configured as or otherwise support a means for transmitting, to the second device, control information scheduling resources for communicating via a set of shared channel transmissions, the resources based on a first beam switching configuration, the first beam switching configuration exceeding the beam switching capability of the second device. The communications manager 1120 may be configured as or otherwise support a means for determining a second beam switching configuration based on applying at least one selection rule to the first beam switching configuration. The communications manager 1120 may be configured as or otherwise support a means for communicating via the set of shared channel transmissions over the scheduled resources based on the second beam switching configuration.

By including or configuring the communications manager 1120 in accordance with examples as described herein, the device 1105 may support techniques for beam switching in wireless communications systems such that the device 1105 may exhibit a reduced latency, a more efficient resource utilization, improved coordination between devices, or a reduced signaling overhead, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for beam switching in wireless communications systems as described herein, or the processor 1140 and the memory 1130 may be otherwise configured to perform or support such operations.

Figure 12:
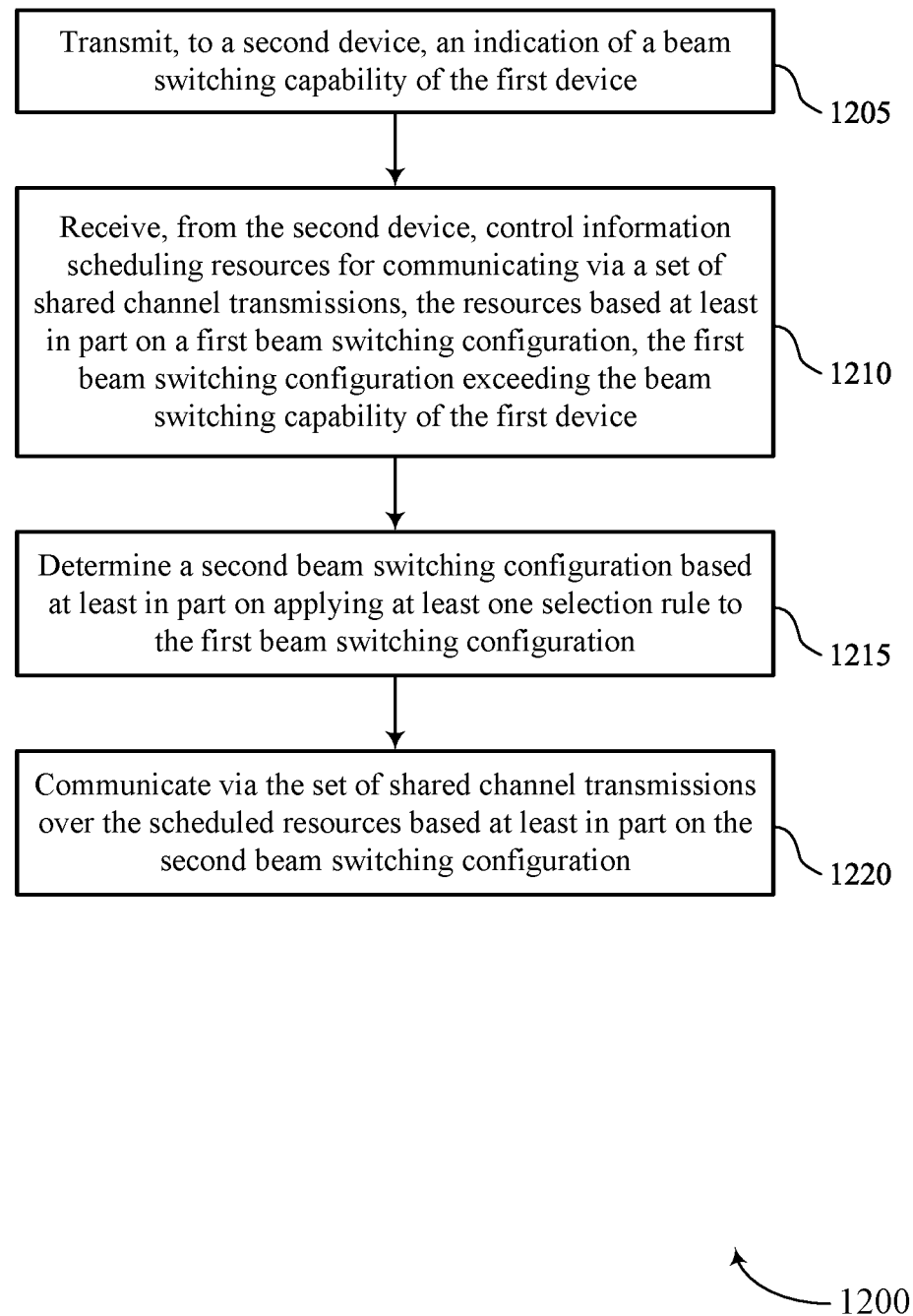
FIGS. 12 through 17 show flowcharts illustrating methods that support techniques for beam switching in wireless communications systems in accordance with aspects of the present disclosure.

FIG. 12 shows a flowchart illustrating a method 1200 that supports techniques for beam switching in wireless communications systems in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting, to a second device, an indication of a beam switching capability of the first device. The operations of 1205 may be performed in accordance with examples as disclosed herein. In some examples, aspects of the operations of 1205 may be performed by a capability transmitter 625 as described with reference to FIG. 6. For example, the capability transmitter 625 may identify time or frequency resources over which to transmit the indication of a beam switching capability and may encode bits representative of the indication onto and modulate the resources for transmitting to the second device.

At 1210, the method may include receiving, from the second device, control information scheduling resources for communicating via a set of shared channel transmissions, the resources based on a first beam switching configuration, the first beam switching configuration exceeding the beam switching capability of the first device. The operations of 1210 may be performed in accordance with examples as disclosed herein. In some examples, aspects of the operations of 1210 may be performed by a control receiver 630 as described with reference to FIG. 6. For example, the control receiver 630 may identify time or frequency resources over which to monitor for the control information and may demodulate and decode the identified resources to obtain bits representative of the control information.

At 1215, the method may include determining a second beam switching configuration based on applying at least one selection rule to the first beam switching configuration. The operations of 1215 may be performed in accordance with examples as disclosed herein. In some examples, aspects of the operations of 1215 may be performed by a beam component 635 as described with reference to FIG. 6.

At 1220, the method may include communicating via the set of shared channel transmissions over the scheduled resources based on the second beam switching configuration. The operations of 1220 may be performed in accordance with examples as disclosed herein. In some examples, aspects of the operations of 1220 may be performed by a shared channel manager 640 as described with reference to FIG. 6. For example, the shared channel manager 640 may transmit or receive shared channel transmissions over the scheduled resources according to the second beam switching configuration.

Figure 13:
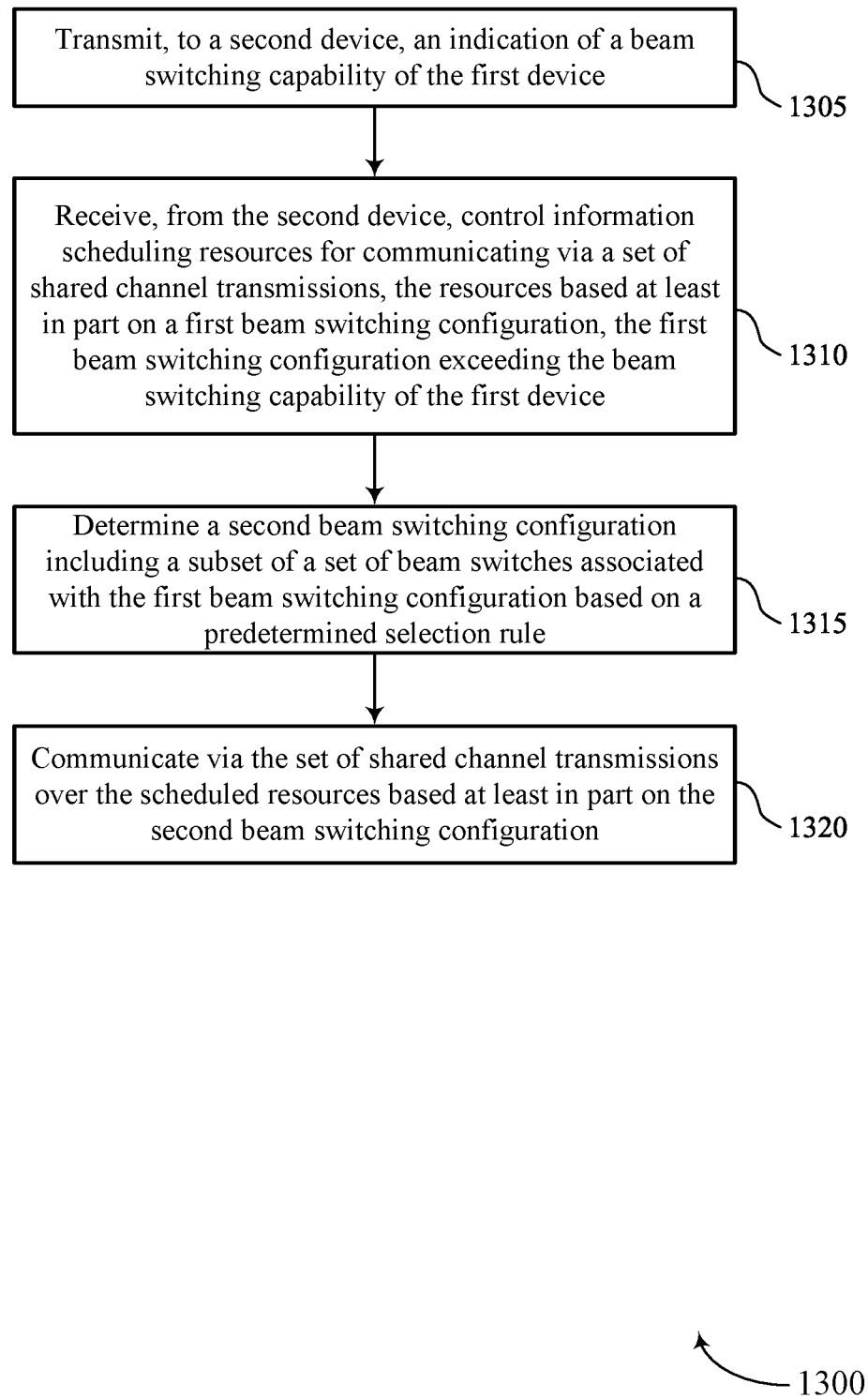

FIG. 13 shows a flowchart illustrating a method 1300 that supports techniques for beam switching in wireless communications systems in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include transmitting, to a second device, an indication of a beam switching capability of the first device. The operations of 1305 may be performed in accordance with examples as disclosed herein. In some examples, aspects of the operations of 1305 may be performed by a capability transmitter 625 as described with reference to FIG. 6. For example, the capability transmitter 625 may identify time or frequency resources over which to transmit the indication of a beam switching capability and may encode bits representative of the indication onto and modulate the resources for transmitting to the second device.

At 1310, the method may include receiving, from the second device, control information scheduling resources for communicating via a set of shared channel transmissions, the resources based on a first beam switching configuration, the first beam switching configuration exceeding the beam switching capability of the first device. The operations of 1310 may be performed in accordance with examples as disclosed herein. In some examples, aspects of the operations of 1310 may be performed by a control receiver 630 as described with reference to FIG. 6. For example, the control receiver 630 may identify time or frequency resources over which to monitor for the control information and may demodulate and decode the identified resources to obtain bits representative of the control information.

At 1315, the method may include determining a second beam switching configuration including a subset of a set of beam switches associated with the first beam switching configuration based on a predetermined and/or pre-agreed selection rule. The operations of 1315 may be performed in accordance with examples as disclosed herein. In some examples, aspects of the operations of 1315 may be performed by a beam component 635 as described with reference to FIG. 6.

At 1320, the method may include communicating via the set of shared channel transmissions over the scheduled resources based on the second beam switching configuration. The operations of 1320 may be performed in accordance with examples as disclosed herein. In some examples, aspects of the operations of 1320 may be performed by a shared channel manager 640 as described with reference to FIG. 6. For example, the shared channel manager 640 may transmit or receive shared channel transmissions over the scheduled resources according to the second beam switching configuration.

Figure 14:
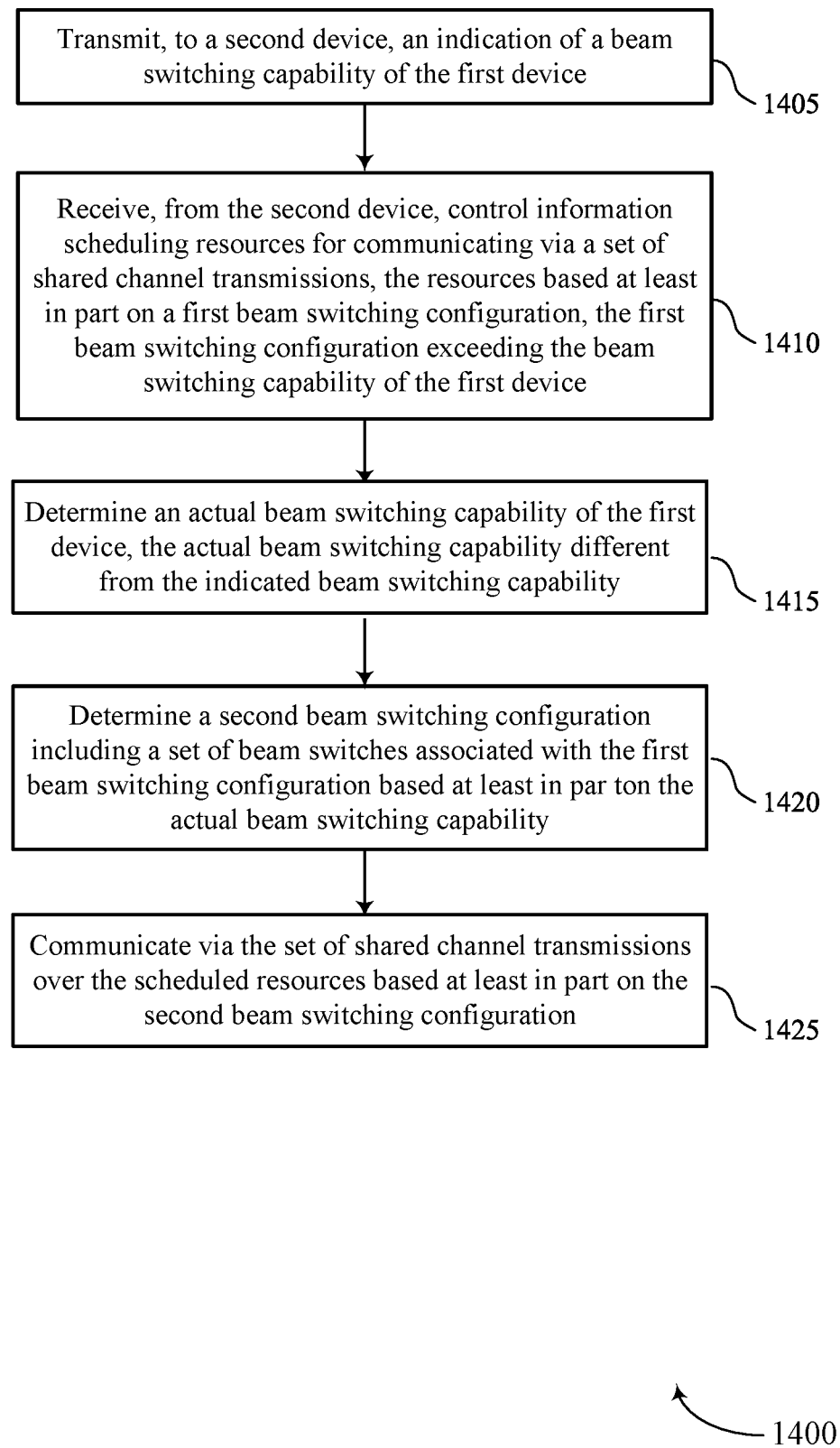

FIG. 14 shows a flowchart illustrating a method 1400 that supports techniques for beam switching in wireless communications systems in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include transmitting, to a second device, an indication of a beam switching capability of the first device. The operations of 1405 may be performed in accordance with examples as disclosed herein. In some examples, aspects of the operations of 1405 may be performed by a capability transmitter 625 as described with reference to FIG. 6. For example, the capability transmitter 625 may identify time or frequency resources over which to transmit the indication of a beam switching capability and may encode bits representative of the indication onto and modulate the resources for transmitting to the second device.

At 1410, the method may include receiving, from the second device, control information scheduling resources for communicating via a set of shared channel transmissions, the resources based on a first beam switching configuration, the first beam switching configuration exceeding the beam switching capability of the first device. The operations of 1410 may be performed in accordance with examples as disclosed herein. In some examples, aspects of the operations of 1410 may be performed by a control receiver 630 as described with reference to FIG. 6. For example, the control receiver 630 may identify time or frequency resources over which to monitor for the control information and may demodulate and decode the identified resources to obtain bits representative of the control information.

At 1415, the method may include determining an actual beam switching capability of the first device, the actual beam switching capability different from the indicated beam switching capability. The operations of 1415 may be performed in accordance with examples as disclosed herein. In some examples, aspects of the operations of 1415 may be performed by a capability component 645 as described with reference to FIG. 6.

At 1420, the method may include determining a second beam switching configuration including a set of beam switches associated with the first beam switching configuration based on the actual beam switching capability. The operations of 1420 may be performed in accordance with examples as disclosed herein. In some examples, aspects of the operations of 1420 may be performed by a beam component 635 as described with reference to FIG. 6.

At 1425, the method may include communicating via the set of shared channel transmissions over the scheduled resources based on the second beam switching configuration. The operations of 1425 may be performed in accordance with examples as disclosed herein. In some examples, aspects of the operations of 1425 may be performed by a shared channel manager 640 as described with reference to FIG. 6. For example, the shared channel manager 640 may transmit or receive shared channel transmissions over the scheduled resources according to the second beam switching configuration.

Figure 15:
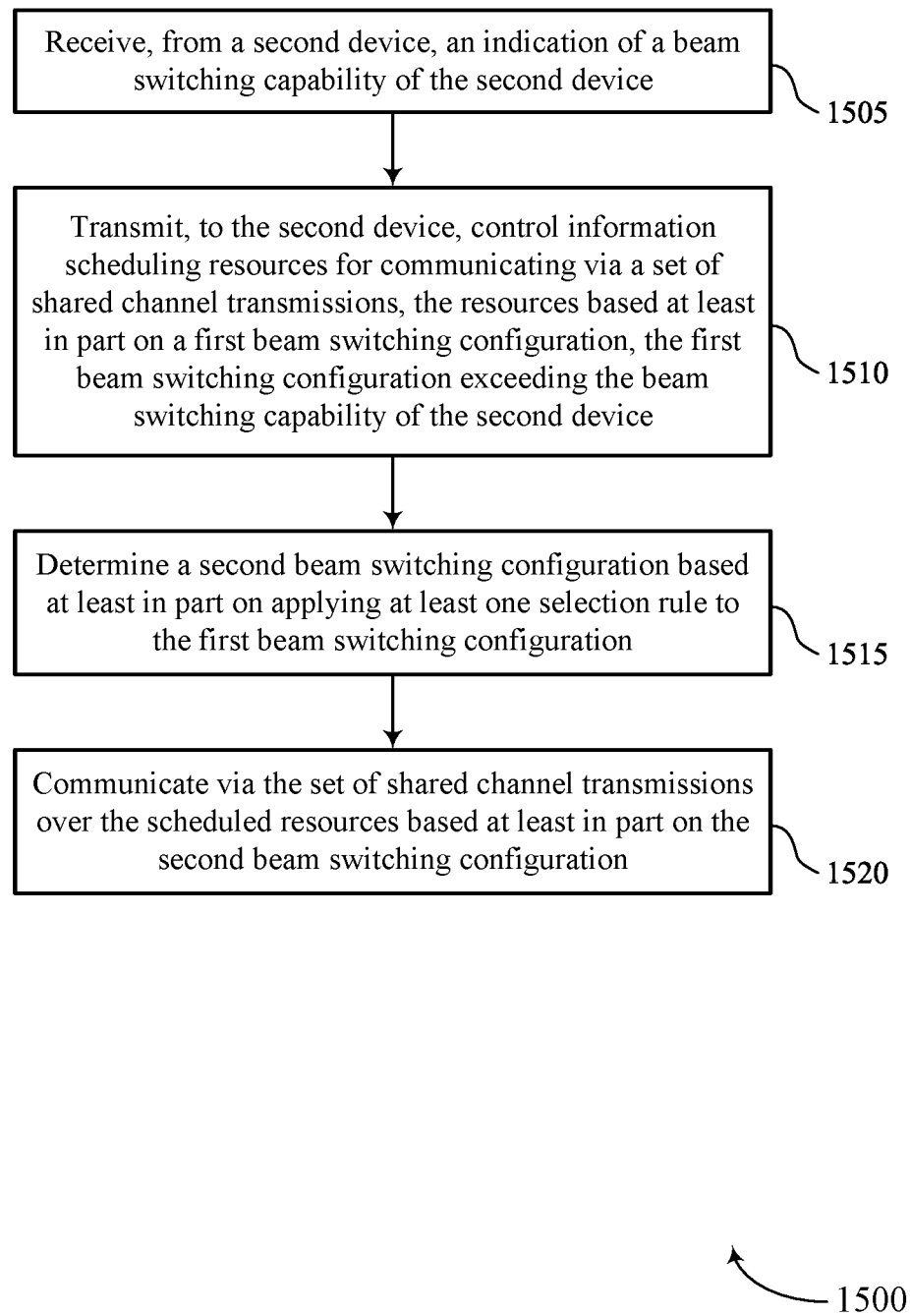

FIG. 15 shows a flowchart illustrating a method 1500 that supports techniques for beam switching in wireless communications systems in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a second device, an indication of a beam switching capability of the second device. The operations of 1505 may be performed in accordance with examples as disclosed herein. In some examples, aspects of the operations of 1505 may be performed by a capability receiver 1025 as described with reference to FIG. 10. For example, the capability receiver 1025 may identify time or frequency resources over which to monitor for the indication of the beam switching capability and may demodulate and decode the identified resources to obtain bits representative of the indication.

At 1510, the method may include transmitting, to the second device, control information scheduling resources for communicating via a set of shared channel transmissions, the resources based on a first beam switching configuration, the first beam switching configuration exceeding the beam switching capability of the second device. The operations of 1510 may be performed in accordance with examples as disclosed herein. In some examples, aspects of the operations of 1510 may be performed by a control transmitter 1030 as described with reference to FIG. 10. For example, the control transmitter 1030 may identify time or frequency resources over which to transmit the control information and may encode bits representative of the control information onto and modulate the resources for transmitting to the second device.

At 1515, the method may include determining a second beam switching configuration based on applying at least one selection rule to the first beam switching configuration. The operations of 1515 may be performed in accordance with examples as disclosed herein. In some examples, aspects of the operations of 1515 may be performed by a beam manager 1035 as described with reference to FIG. 10.

At 1520, the method may include communicating via the set of shared channel transmissions over the scheduled resources based on the second beam switching configuration. The operations of 1520 may be performed in accordance with examples as disclosed herein. In some examples, aspects of the operations of 1520 may be performed by a shared channel component 1040 as described with reference to FIG. 10. For example, the shared channel component 1040 may transmit or receive shared channel transmissions over the scheduled resources according to the second beam switching configuration.

Figure 16:
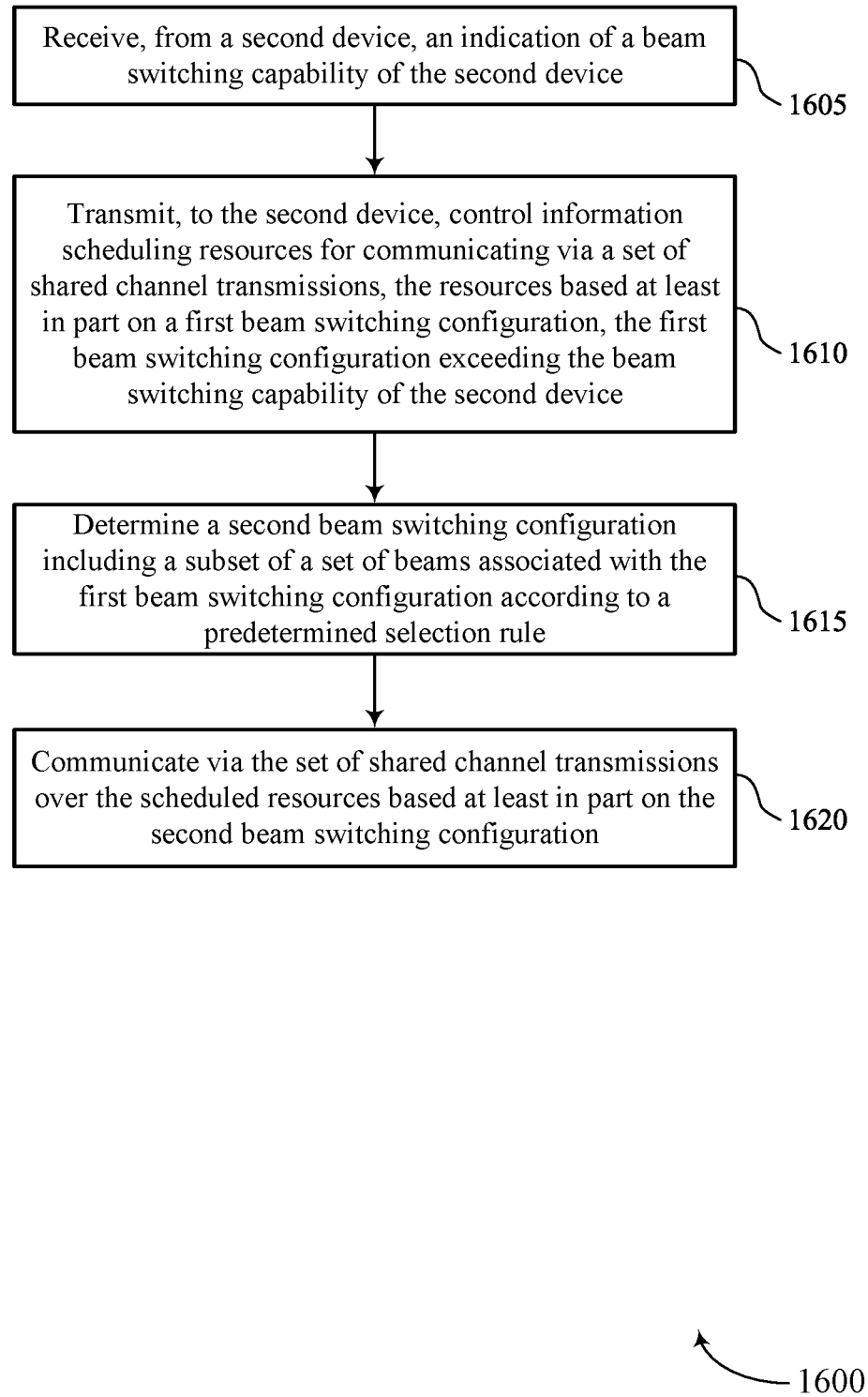

FIG. 16 shows a flowchart illustrating a method 1600 that supports techniques for beam switching in wireless communications systems in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include receiving, from a second device, an indication of a beam switching capability of the second device. The operations of 1605 may be performed in accordance with examples as disclosed herein. In some examples, aspects of the operations of 1605 may be performed by a capability receiver 1025 as described with reference to FIG. 10. For example, the capability receiver 1025 may identify time or frequency resources over which to monitor for the indication of the beam switching capability and may demodulate and decode the identified resources to obtain bits representative of the indication.

At 1610, the method may include transmitting, to the second device, control information scheduling resources for communicating via a set of shared channel transmissions, the resources based on a first beam switching configuration, the first beam switching configuration exceeding the beam switching capability of the second device. The operations of 1610 may be performed in accordance with examples as disclosed herein. In some examples, aspects of the operations of 1610 may be performed by a control transmitter 1030 as described with reference to FIG. 10. For example, the control transmitter 1030 may identify time or frequency resources over which to transmit the control information and may encode bits representative of the control information onto and modulate the resources for transmitting to the second device.

At 1615, the method may include determining a second beam switching configuration including a subset of a set of beam switches associated with the first beam switching configuration according to a predetermined and/or pre-agreed selection rule. The operations of 1615 may be performed in accordance with examples as disclosed herein. In some examples, aspects of the operations of 1615 may be performed by a beam manager 1035 as described with reference to FIG. 10.

At 1620, the method may include communicating via the set of shared channel transmissions over the scheduled resources based on the second beam switching configuration. The operations of 1620 may be performed in accordance with examples as disclosed herein. In some examples, aspects of the operations of 1620 may be performed by a shared channel component 1040 as described with reference to FIG. 10. For example, the shared channel component 1040 may transmit or receive shared channel transmissions over the scheduled resources according to the second beam switching configuration.

Figure 17:
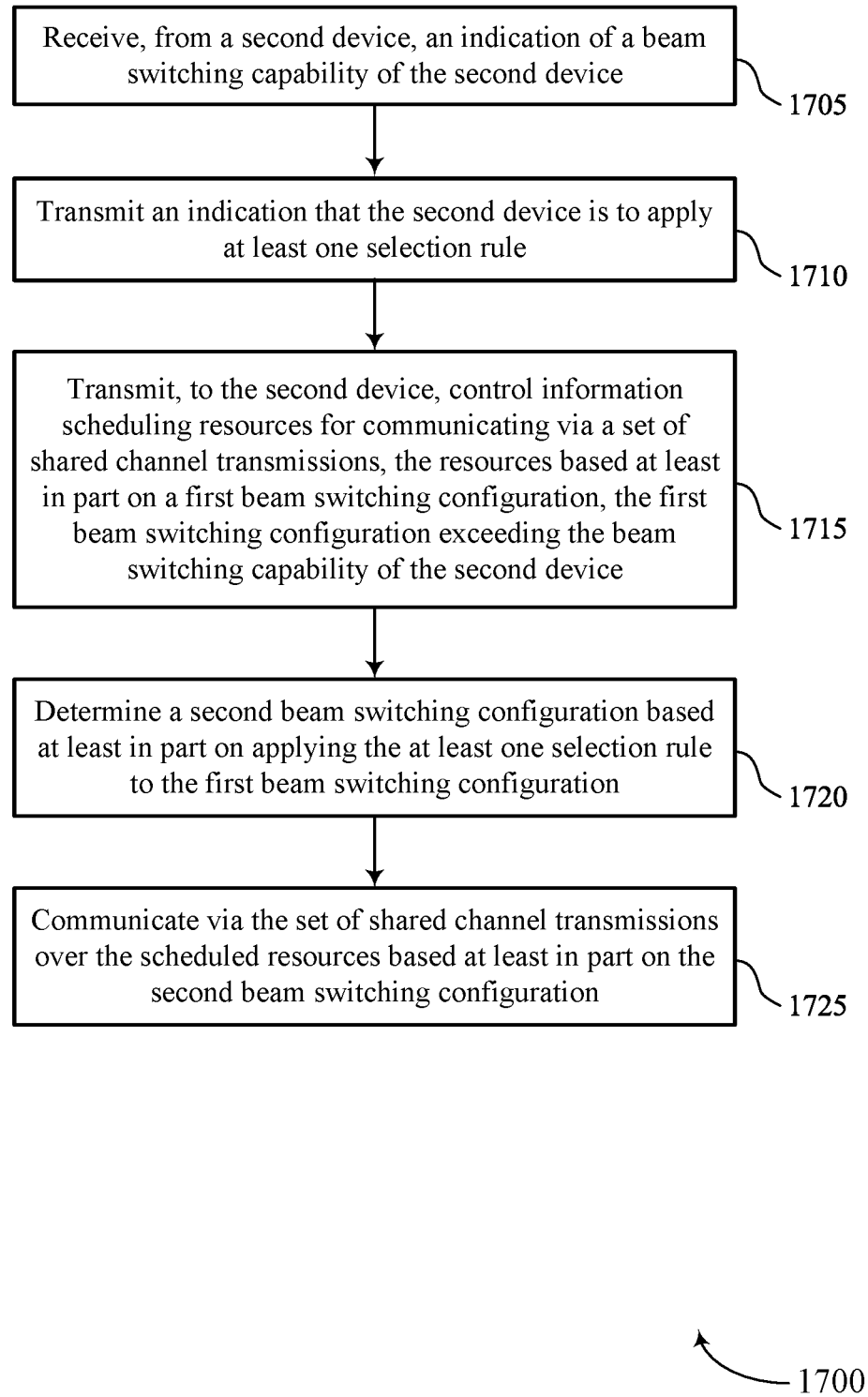

FIG. 17 shows a flowchart illustrating a method 1700 that supports techniques for beam switching in wireless communications systems in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include receiving, from a second device, an indication of a beam switching capability of the second device. The operations of 1705 may be performed in accordance with examples as disclosed herein. In some examples, aspects of the operations of 1705 may be performed by a capability receiver 1025 as described with reference to FIG. 10. For example, the capability receiver 1025 may identify time or frequency resources over which to monitor for the indication of the beam switching capability and may demodulate and decode the identified resources to obtain bits representative of the indication.

At 1710, the method may include transmitting an indication that the second device is to apply at least one selection rule. The operations of 1710 may be performed in accordance with examples as disclosed herein. In some examples, aspects of the operations of 1710 may be performed by an indication transmitter 1050 as described with reference to FIG. 10. For example, the indication transmitter 1050 may identify time or frequency resources over which to transmit the indication and may encode bits representative of the indication onto and modulate the resources for transmitting to the second device.

At 1715, the method may include transmitting, to the second device, control information scheduling resources for communicating via a set of shared channel transmissions, the resources based on a first beam switching configuration, the first beam switching configuration exceeding the beam switching capability of the second device. The operations of 1715 may be performed in accordance with examples as disclosed herein. In some examples, aspects of the operations of 1715 may be performed by a control transmitter 1030 as described with reference to FIG. 10. For example, the control transmitter 1030 may identify time or frequency resources over which to transmit the control information and may encode bits representative of the control information onto and modulate the resources for transmitting to the second device.

At 1720, the method may include determining a second beam switching configuration based on applying the at least one selection rule to the first beam switching configuration. The operations of 1720 may be performed in accordance with examples as disclosed herein. In some examples, aspects of the operations of 1720 may be performed by a beam manager 1035 as described with reference to FIG. 10.

At 1725, the method may include communicating via the set of shared channel transmissions over the scheduled resources based on the second beam switching configuration. The operations of 1725 may be performed in accordance with examples as disclosed herein. In some examples, aspects of the operations of 1725 may be performed by a shared channel component 1040 as described with reference to FIG. 10. For example, the shared channel component 1040 may transmit or receive shared channel transmissions over the scheduled resources according to the second beam switching configuration.

The following provides an overview of aspects of the present disclosure:

Aspect 1: A method for wireless communication at a first device, comprising: transmitting, to a second device, an indication of a beam switching capability of the first device; receiving, from the second device, control information scheduling resources for communicating via a set of shared channel transmissions, the resources based at least in part on a first beam switching configuration, the first beam switching configuration exceeding the beam switching capability of the first device; determining a second beam switching configuration based at least in part on applying at least one selection rule to the first beam switching configuration; and communicating via the set of shared channel transmissions over the scheduled resources based at least in part on the second beam switching configuration.

Aspect 2: The method of aspect 1, wherein applying the at least one selection rule comprises: determining a subset of a set of beam switches associated with the first beam switching configuration according to a predetermined selection rule, wherein the second beam switching configuration comprises the subset of the set of beam switches.

Aspect 3: The method of any of aspects 1 through 2, wherein the first beam switching configuration comprises a set of N beam switches; and the beam switching capability of the first device comprises a capability to perform M beam switches.

Aspect 4: The method of aspect 3, further comprising: selecting M beam switches that are first in time of the set of N beam switches of the first beam switching configuration; and selecting the $M^{th}$ beam for the N-M other beam switches of the set of N beam switches of the first beam switching configuration, wherein the second beam switching configuration is based at least in part on selecting the M beam switches and selecting the $M^{th}$ beam for the N-M other beam switches.

Aspect 5: The method of any of aspects 3 through 4, further comprising: selecting an M-fold permutation of the set of N beam switches of the first beam switching configuration, wherein the second beam switching configuration comprises the M-fold permutation.

Aspect 6: The method of any of aspects 1 through 5, wherein applying the at least one selection rule comprises: determining an actual beam switching capability of the first device, the actual beam switching capability different from the indicated beam switching capability; and determining a set of beam switches associated with the first beam switching configuration based at least in part on the actual beam switching capability, wherein the second beam switching configuration comprises the set of beam switches.

Aspect 7: The method of aspect 6, wherein determining the actual beam switching capability is based at least in part on a correspondence between a set of antenna components of the first device and the set of beam switches associated with the first beam switching configuration.

Aspect 8: The method of any of aspects 1 through 7, wherein applying the at least one selection rule comprises: determining respective performance metrics for a set of beam switches associated with the first beam switching configuration; and determining a subset of the set of beam switches associated with the first beam switching configuration based at least in part on the respective performance metrics, wherein the second beam switching configuration comprises the subset of the set of beam switches.

Aspect 9: The method of aspect 8, wherein determining the respective performance metrics comprises: determining a RSRP associated with each beam switch of the set of beam switches associated with the first beam switching configuration.

Aspect 10: The method of any of aspects 1 through 9, wherein applying the at least one selection rule comprises: determining a beam associated with receiving the control information, wherein the second beam switching configuration comprises the beam associated with receiving the control information.

Aspect 11: The method of any of aspects 1 through 10, wherein applying the at least one selection rule comprises: determining a beam associated with a sidelink with a third device, wherein the second beam switching configuration comprises the beam associated with the sidelink.

Aspect 12: The method of any of aspects 1 through 11, wherein applying the at least one selection rule comprises determining a most recently used beam different from a beam associated with receiving the control information, the second beam switching configuration comprises the most recently used beam Aspect 13: The method of any of aspects 1 through 12, further comprising: receiving an indication that the first device is to apply the at least one selection rule, wherein determining the second beam switching configuration is based at least in part on the receiving the indication that the first device is to apply the at least one selection rule.

Aspect 14: The method of aspect 13, wherein receiving the indication that the first device is to apply the at least one selection rule comprises: receiving the indication that the first device is to apply the at least one selection rule via DCI of a scheduling grant, a configured grant, a beam switching command in a MAC-CE or DCI, or via sidelink control signaling.

Aspect 15: The method of any of aspects 1 through 14, further comprising: receiving an indication of a set of selection rules, wherein the set of selection rules comprises the at least one selection rule.

Aspect 16: The method of any of aspects 1 through 15, further comprising: receiving an indication of a set of beam switches the first device is to perform for communicating via the set of shared channel transmissions, the set of beam switches associated with concurrent beams associated with two or more transmission reception points of the first device.

Aspect 17: A method for wireless communication at a first device, comprising: receiving, from a second device, an indication of a beam switching capability of the second device; transmitting, to the second device, control information scheduling resources for communicating via a set of shared channel transmissions, the resources based at least in part on a first beam switching configuration, the first beam switching configuration exceeding the beam switching capability of the second device; determining a second beam switching configuration based at least in part on applying at least one selection rule to the first beam switching configuration; and communicating via the set of shared channel transmissions over the scheduled resources based at least in part on the second beam switching configuration.

Aspect 18: The method of aspect 17, wherein applying the at least one selection rule comprises: determining a sequential subset of a set of beam switches associated with the first beam switching configuration, wherein the second beam switching configuration comprises the sequential subset of the set of beam switches.

Aspect 19: The method of any of aspects 17 through 18, wherein applying the at least one selection rule comprises: determining a subset of a set of beam switches associated with the first beam switching configuration according to a predetermined selection rule, wherein the second beam switching configuration comprises the subset of the set of beam switches.

Aspect 20: The method of any of aspects 17 through 19, wherein applying the at least one selection rule comprises: determining respective performance metrics for a set of beam switches associated with the first beam switching configuration; and determining a subset of the set of beam switches associated with the first beam switching configuration based at least in part on determining the respective performance metrics, wherein the second beam switching configuration comprises the subset of the set of beam switches.

Aspect 21: The method of aspect 20, wherein determining the respective performance metrics comprises: determining a RSRP for each beam switch of the set of beam switches associated with the first beam switching configuration.

Aspect 22: The method of any of aspects 17 through 21, wherein applying the at least one selection rule comprises: determining a beam associated with transmitting the control information, wherein the second beam switching configuration comprises the beam associated with transmitting the control information.

Aspect 23: The method of any of aspects 17 through 22, wherein applying the at least one selection rule comprises: determining a most recently used beam different from a beam associated with receiving the control information, wherein the second beam switching configuration the most recently used beam.

Aspect 24: The method of any of aspects 17 through 23, further comprising: transmitting an indication of a set of selection rules, wherein the set of selection rules comprises the at least one selection rule.

Aspect 25: The method of any of aspects 17 through 24, further comprising: transmitting an indication that the second device is to apply the at least one selection rule, wherein determining the second beam switching configuration is based at least in part on the transmitting the indication that the second device is to apply the at least one selection rule.

Aspect 26: The method of aspect 25, wherein receiving the indication that the second device is to apply the at least one selection rule comprises: transmitting the indication that the second device is to apply the at least one selection rule via DCI of a scheduling grant, a configured grant, a beam switching command in a MAC-CE or DCI, or via sidelink control signaling.

Aspect 27: The method of any of aspects 17 through 26, wherein determining the second beam switching configuration comprises: processing the set of shared channel transmissions according to a plurality of beam switching configuration hypotheses; and determining the second beam switching configuration from among the plurality of beam switching configuration hypotheses based at least in part on the processing.

Aspect 28: The method of any of aspects 17 through 27, further comprising: transmitting an indication of a set of beam switches the first device is to perform for communicating via the set of shared channel transmissions, the set of beam switches associated with concurrent beams associated with two or more transmission reception points of the first device.

Aspect 29: An apparatus for wireless communication at a first device, comprising a processor; memory coupled with the processor; and instructions stored in the memory and executable by the processor to cause the apparatus to perform a method of any of aspects 1 through 16.

Aspect 30: An apparatus for wireless communication at a first device, comprising at least one means for performing a method of any of aspects 1 through 16.

Aspect 31: A non-transitory computer-readable medium storing code for wireless communication at a first device, the code comprising instructions executable by a processor to perform a method of any of aspects 1 through 16.

Aspect 32: An apparatus for wireless communication at a first device, comprising a processor; memory coupled with the processor; and instructions stored in the memory and executable by the processor to cause the apparatus to perform a method of any of aspects 17 through 28.

Aspect 33: An apparatus for wireless communication at a first device, comprising at least one means for performing a method of any of aspects 17 through 28.

Aspect 34: A non-transitory computer-readable medium storing code for wireless communication at a first device, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
   a processor;
   memory coupled with the processor; and
   instructions stored in the memory and executable by the processor to cause the apparatus to:
      transmit, to a second device, an indication of a beam switching capability of the first device, the beam switching capability indicating a first quantity of beam switches the first device is capable of performing within a time period;
      receive, from the second device, control information scheduling resources for communicating via a set of shared channel transmissions, the resources based at least in part on a first beam switching configuration comprising a second quantity of beam switches exceeding the first quantity of beam switches indicated by the beam switching capability of the first device;

determine a second beam switching configuration comprising a subset of the second quantity of beam switches based at least in part on applying at least one selection rule to the first beam switching configuration; and communicate via the set of shared channel transmissions over the scheduled resources based at least in part on the second beam switching configuration.

2. The apparatus of claim 1, wherein the instructions to apply the at least one selection rule are executable by the processor to cause the apparatus to:

determine a subset of a set of beam switches associated with the first beam switching configuration according to a predetermined selection rule, wherein the second beam switching configuration comprises the subset of the set of beam switches.

3. The apparatus of claim 1, wherein the instructions are further executable by the processor to cause the apparatus to:

select M beam switches that are first in time of a set of N beam switches of the first beam switching configuration; and select an Mth beam for N-M other beam switches of the set of N beam switches of the first beam switching configuration, wherein the second beam switching configuration is based at least in part on selecting the M beam switches and selecting the Mth beam for the N-M other beam switches.

4. The apparatus of claim 3, wherein the instructions are further executable by the processor to cause the apparatus to:

select an M-fold permutation of the set of N beam switches of the first beam switching configuration, wherein the second beam switching configuration comprises the M-fold permutation.

5. The apparatus of claim 1, wherein the instructions to apply the at least one selection rule are executable by the processor to cause the apparatus to:

determine an actual beam switching capability of the first device, the actual beam switching capability different from the indicated beam switching capability; and determine a set of beam switches associated with the first beam switching configuration based at least in part on the actual beam switching capability, wherein the second beam switching configuration comprises the set of beam switches.

6. The apparatus of claim 5, wherein determining the actual beam switching capability is based at least in part on a set of antenna components of the first device.

7. The apparatus of claim 1, wherein the instructions to apply the at least one selection rule are executable by the processor to cause the apparatus to:

determine respective performance metrics for a set of beam switches associated with the first beam switching configuration; and determine a subset of the set of beam switches associated with the first beam switching configuration based at least in part on the respective performance metrics, wherein the second beam switching configuration comprises the subset of the set of beam switches.

8. The apparatus of claim 7, wherein the instructions to determine the respective performance metrics are executable by the processor to cause the apparatus to:

determine a reference signal received power (RSRP) associated with each beam switch of the set of beam switches associated with the first beam switching configuration.

9. The apparatus of claim 1, wherein the instructions to apply the at least one selection rule are executable by the processor to cause the apparatus to:

determine a beam associated with receiving the control information, wherein the second beam switching configuration comprises the beam associated with receiving the control information.

10. The apparatus of claim 1, wherein the instructions to apply the at least one selection rule are executable by the processor to cause the apparatus to:

determine a beam associated with a sidelink with a third device, wherein the second beam switching configuration comprises the beam associated with the sidelink.

11. The apparatus of claim 1, wherein:

applying the at least one selection rule comprises determining a most recently used beam different from a beam associated with receiving the control information, the second beam switching configuration comprising the most recently used beam.

12. The apparatus of claim 1, wherein the instructions are further executable by the processor to cause the apparatus to:

receive an indication that the first device is to apply the at least one selection rule, wherein determining the second beam switching configuration is based at least in part on the receiving the indication that the first device is to apply the at least one selection rule.

13. The apparatus of claim 12, wherein the instructions to receive the indication that the first device is to apply the at least one selection rule are executable by the processor to cause the apparatus to:

receive the indication that the first device is to apply the at least one selection rule via downlink control information (DCI) of a scheduling grant, a configured grant, a beam switching command in a Medium Access Control (MAC) control element (MAC-CE) or DCI, or via sidelink control signaling.

14. The apparatus of claim 1, wherein the instructions are further executable by the processor to cause the apparatus to:

receive an indication of a set of selection rules, wherein the set of selection rules comprises the at least one selection rule.

15. The apparatus of claim 1, wherein the instructions are further executable by the processor to cause the apparatus to:

receive an indication of a set of beam switches the first device is to perform for communicating via the set of shared channel transmissions, the set of beam switches associated with concurrent beams associated with two or more transmission reception points of the first device.

16. An apparatus for wireless communication at a first device, comprising:

a processor;

memory coupled with the processor; and instructions stored in the memory and executable by the processor to cause the apparatus to:

receive, from a second device, an indication of a beam switching capability of the second device, the beam switching capability indicating a first quantity of beam switches the second device is capable of performing within a time period;

transmit, to the second device, control information scheduling resources for communicating via a set of shared channel transmissions, the resources based at least in part on a first beam switching configuration comprising a second quantity of beam switches exceeding the first quantity of beam switches indicated by the beam switching capability of the second device determine a second beam switching configuration comprising a subset of the second quantity of beam switches based at least in part on applying at least one selection rule to the first beam switching configuration; and communicate via the set of shared channel transmissions over the scheduled resources based at least in part on the second beam switching configuration.

17. The apparatus of claim 16, wherein the instructions to apply the at least one selection rule are executable by the processor to cause the apparatus to:

determine a sequential subset of a set of beam switches associated with the first beam switching configuration, wherein the second beam switching configuration comprises the sequential subset of the set of beam switches.

18. The apparatus of claim 16, wherein the instructions to apply the at least one selection rule are executable by the processor to cause the apparatus to:

determine a subset of a set of beam switches associated with the first beam switching configuration according to a predetermined selection rule, wherein the second beam switching configuration comprises the subset of the set of beam switches.

19. The apparatus of claim 16, wherein the instructions to apply the at least one selection rule are executable by the processor to cause the apparatus to:

determine respective performance metrics for a set of beam switches associated with the first beam switching configuration; and determine a subset of the set of beam switches associated with the first beam switching configuration based at least in part on determining the respective performance metrics, wherein the second beam switching configuration comprises the subset of the set of beam switches.

20. The apparatus of claim 19, wherein the instructions to determine the respective performance metrics are executable by the processor to cause the apparatus to:

determine a reference signal received power (RSRP) for each beam switch of the set of beam switches associated with the first beam switching configuration.

21. The apparatus of claim 16, wherein the instructions to apply the at least one selection rule are executable by the processor to cause the apparatus to:

determine a beam associated with transmitting the control information, wherein the second beam switching configuration comprises the beam associated with transmitting the control information.

22. The apparatus of claim 16, wherein the instructions to apply the at least one selection rule are executable by the processor to cause the apparatus to:

determine a most recently used beam different from a beam associated with receiving the control information, wherein the second beam switching configuration the most recently used beam.

23. The apparatus of claim 16, wherein the instructions are further executable by the processor to cause the apparatus to:

transmit an indication of a set of selection rules, wherein the set of selection rules comprises the at least one selection rule.

24. The apparatus of claim 16, wherein the instructions are further executable by the processor to cause the apparatus to:

transmit an indication that the second device is to apply the at least one selection rule, wherein determining the second beam switching configuration is based at least in part on the transmitting the indication that the second device is to apply the at least one selection rule.

25. The apparatus of claim 24, wherein the instructions to receive the indication that the second device is to apply the at least one selection rule are executable by the processor to cause the apparatus to:

transmit the indication that the second device is to apply the at least one selection rule via downlink control information (DCI) of a scheduling grant, a configured grant, a beam switching command in a Medium Access Control (MAC) control element (MAC-CE) or DCI, or via sidelink control signaling.

26. The apparatus of claim 16, wherein the instructions to determine the second beam switching configuration are executable by the processor to cause the apparatus to:

process the set of shared channel transmissions according to a plurality of beam switching configuration hypotheses; and determine the second beam switching configuration from among the plurality of beam switching configuration hypotheses based at least in part on the processing.

27. The apparatus of claim 16, wherein the instructions are further executable by the processor to cause the apparatus to:

transmit an indication of a set of beam switches the first device is to perform for communicating via the set of shared channel transmissions, the set of beam switches associated with concurrent beams associated with two or more transmission reception points of the first device.

28. A method for wireless communication at a first device, comprising:

transmitting, to a second device, an indication of a beam switching capability of the first device, the beam switching capability indicating a first quantity of beam switches the first device is capable of performing within a time period;

receiving, from the second device, control information scheduling resources for communicating via a set of shared channel transmissions, the resources based at least in part on a first beam switching configuration comprising a second quantity of beam switches exceeding the first quantity of beam switches indicated by the beam switching capability of the first device;

determining a second beam switching configuration comprising a subset of the second quantity of beam switches based at least in part on applying at least one selection rule to the first beam switching configuration; and communicating via the set of shared channel transmissions over the scheduled resources based at least in part on the second beam switching configuration.

29. A method for wireless communication at a first device, comprising:

receiving, from a second device, an indication of a beam switching capability of the second device, the beam switching capability indicating a first quantity of beam switches the second device is capable of performing within a time period;

transmitting, to the second device, control information scheduling resources for communicating via a set of shared channel transmissions, the resources based at least in part on a first beam switching configuration comprising a second quantity of beam switches exceeding the first quantity of beam switches indicated by the beam switching capability of the second device;

determining a second beam switching configuration comprising a subset of the second quantity of beam switches based at least in part on applying at least one selection rule to the first beam switching configuration; and communicating via the set of shared channel transmissions over the scheduled resources based at least in part on the second beam switching configuration.

* * * * *